United States Patent
Yoshida

(10) Patent No.: US 11,106,072 B2
(45) Date of Patent: Aug. 31, 2021

(54) DISPLAY DEVICE

(71) Applicant: Sharp Kabushiki Kaisha, Sakai (JP)

(72) Inventor: Masahiro Yoshida, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 16/798,516

(22) Filed: Feb. 24, 2020

(65) Prior Publication Data
US 2020/0272012 A1    Aug. 27, 2020

Related U.S. Application Data

(60) Provisional application No. 62/811,010, filed on Feb. 27, 2019.

(51) Int. Cl.
| | | |
|---|---|---|
| *G02F 1/1333* | (2006.01) | |
| *G02F 1/1362* | (2006.01) | |
| *G02F 1/1368* | (2006.01) | |
| *G02F 1/1343* | (2006.01) | |
| *G02F 1/136* | (2006.01) | |

(52) U.S. Cl.
CPC .... *G02F 1/13338* (2013.01); *G02F 1/136218* (2021.01); *G02F 1/136286* (2013.01); *G02F 1/1368* (2013.01); *G02F 1/13606* (2021.01); *G02F 1/134318* (2021.01); *G02F 1/134372* (2021.01); *G02F 2201/123* (2013.01)

(58) Field of Classification Search
CPC .......... G02F 1/13338; G02F 1/134363; G02F 1/134372; G02F 1/136286; G02F 1/136218; G02F 1/134318; G06F 3/041; G06F 3/0412
See application file for complete search history.

(56) References Cited

U.S. PATENT DOCUMENTS

| | | | |
|---|---|---|---|
| 9,024,913 B1* | 5/2015 | Jung | G06F 3/04184 345/174 |
| 9,965,087 B2* | 5/2018 | Xie | G06F 3/0412 |
| 2016/0041665 A1* | 2/2016 | Gwon | G06F 3/0443 345/174 |
| 2016/0216802 A1* | 7/2016 | Bao | G06F 3/0412 |
| 2016/0253024 A1* | 9/2016 | Aoyama | G09G 3/3648 345/174 |
| 2017/0115784 A1* | 4/2017 | Li | G02F 1/13439 |
| 2017/0123538 A1* | 5/2017 | Kuo | G06F 3/0446 |
| 2017/0315395 A1* | 11/2017 | Yeh | G02F 1/13338 |
| 2020/0033684 A1 | 1/2020 | Tanaka et al. | |

FOREIGN PATENT DOCUMENTS

WO    2018/181665 A1    10/2018

\* cited by examiner

*Primary Examiner* — Jia X Pan
(74) *Attorney, Agent, or Firm* — Keating & Bennett, LLP

(57) ABSTRACT

A display device includes pixel electrodes, a common electrode, switching components, pixel lines, and conductive lines. The common electrode overlaps the pixel electrodes via an insulator. The switching components are connected to the pixel electrodes. The pixel lines are connected to the switching components and disposed adjacent to the pixel electrodes. The conductive lines are adjacent to the pixel electrodes on a side on which the pixel lines are disposed. The conductive lines are separated from each other and electrically connected to the common electrode. The conductive lines include common portions having a common positional relation relative to the pixel lines, respectively.

8 Claims, 21 Drawing Sheets

DISPLAY DEVICE

CROSS REFERENCE TO RELATED APPLICATION

This application claims priority from U.S. Provisional Patent Application No. 62/811,010 filed on Feb. 27, 2019. The entire contents of the priority application are incorporated herein by reference.

TECHNICAL FIELD

The technology described herein relates to a display device.

BACKGROUND

An example of a conventional display device described in International Publication WO 2018/181665 has been known. The display device includes gate lines, source lines, driver components connected to the gate lines and the source lines, pixel electrodes connected to the driver components, and color filters disposed to correspond to the pixel electrodes. Each pixel electrode corresponds to a subpixel. One pixel includes multiple subpixels. The display device further includes conductive lines in a pixel region. The conductive lines extend along the gate lines or the source lines. At least sections of the conductive lines are disposed in pixel holes in the subpixels. An interval between the conductive lines is larger than an interval between the pixels.

The display device configured to operate in FFS mode includes conductive lines for applying a voltage (VCOM) to the common electrode. Each of the conductive lines is provided for four subpixels. The number of the conductive lines tends to be small for a size of the common electrode. Therefore, distribution of voltage in a plane of the common electrode tends to be uneven, which may result in a reduction in display quality.

SUMMARY

The technology described herein was made in view of the above circumstances. An object is to reduce a reduction in display quality.

A display device includes pixel electrodes, a common electrode, switching components, and conductive lines. The common electrode overlaps the pixel electrodes via an insulator. The switching components are connected to the pixel electrodes. The pixel lines are connected to the switching components and disposed adjacent to the pixel electrodes. The conductive lines are adjacent to the pixel electrodes on a side on which the pixel lines are disposed, separated from each other, and electrically connected to the common electrode. The conductive lines include common portions having a common positional relation relative to the pixel lines, respectively.

According to the technology described herein, a reduction in display quality can be reduced.

DETAILED DESCRIPTION

First Embodiment

Figure 1:
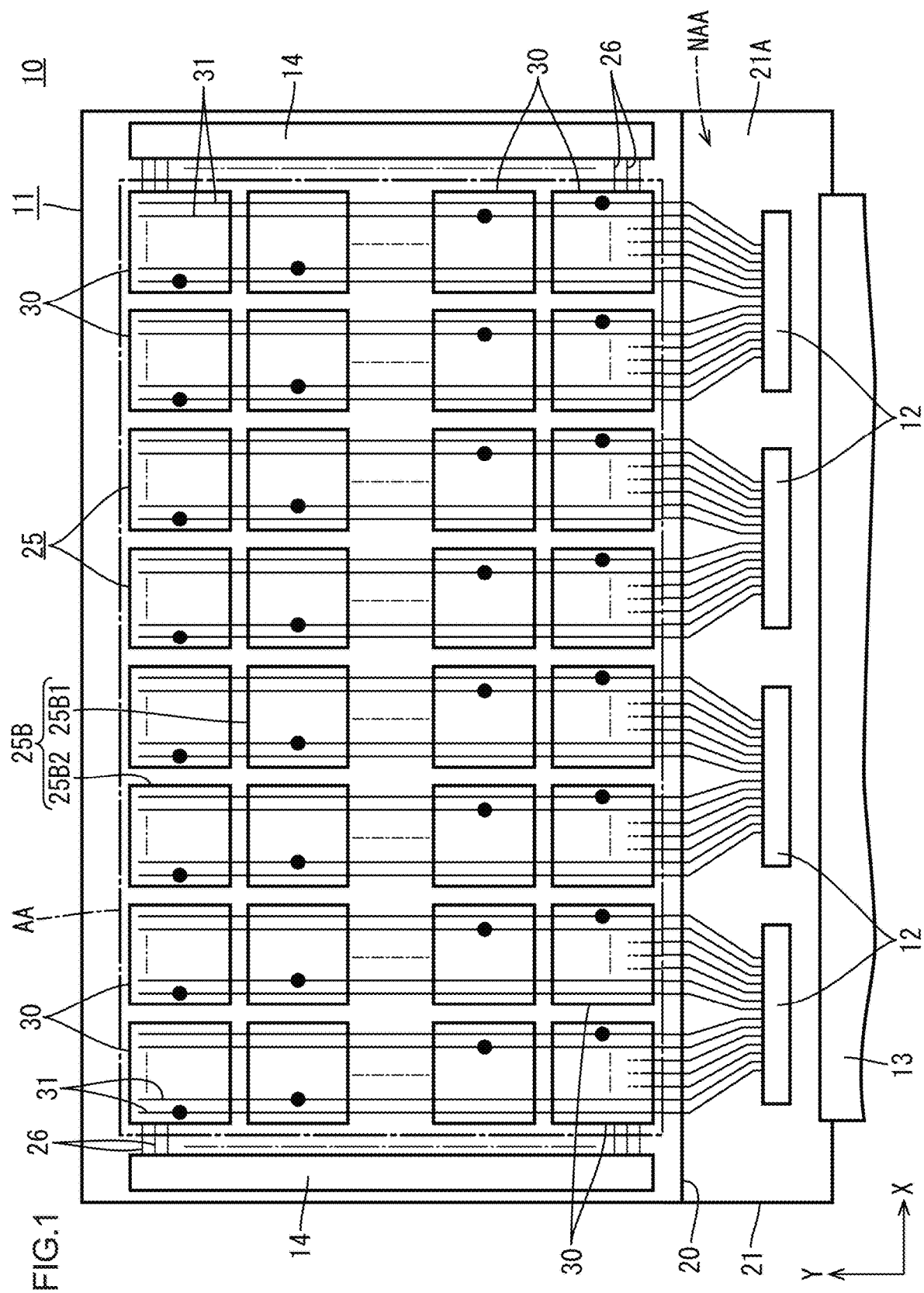
FIG. 1 is a plan view of a liquid crystal panel included in a liquid crystal display device according to a first embodiment illustrating touch electrodes and touch lines.

A first embodiment of the technology described herein will be described in detail with reference to FIGS. 1 to 10. In this section, a liquid crystal display device 10 (a display device having an input position detecting function) having a display function and a touch panel function (a positional input function) will be described. In the drawings, X-axes, Y-axes, and Z-axes may be present. The axes in each drawing correspond to the respective axes in other drawings. An upper side and a lower side in FIGS. 3, 6, 8, 9 and 10 correspond to a front side and a rear side of the liquid crystal display device 10, respectively.

FIG. 1 is a schematic plan view of a liquid crystal panel 11. As illustrated in FIG. 1, the liquid crystal display device 10 has a horizontally-long rectangular shape and includes at least the liquid crystal panel 11 (a display device, a display panel, a display panel having an input position detecting function), and a backlight unit (a lighting device). The liquid crystal panel 11 is configured to display images. The backlight unit is an external light source configured to apply light to the liquid crystal panel 11 for image display. In this embodiment, the liquid crystal panel 11 is provided with a screen size of about 15 inches (specifically, 15.6 inches) and FHD. The backlight unit is disposed behind (on a back side of) the liquid crystal panel 11. The backlight unit includes a light source (e.g., LEDs) configured to emit white light and an optical member configured to exert optical effects on the light from the light source to convert the light into planar light.

As illustrated in FIG. 1, the liquid crystal panel 11 includes a middle area defined as a display area AA (an area defined by a chain line in FIG. 1) in which images are displayed. An outer area of a screen of the liquid crystal panel 11 having a frame shape to surround the display area AA is defined as a non-display area NAA in which the images are not displayed. In this embodiment, a long dimension of the display area AA may be 346.6 mm and a short dimension of the display area AA may be 194.4 mm. The liquid crystal panel 11 includes two substrates 20 and 21 that are bonded together. One of the substrates 20 and 21 on the front side is a CF substrate 20 (an opposed substrate) and the other on the rear side (the back light) is an array substrate 21 (an active matrix substrate, a component substrate). The CF substrate 20 and the array substrate 21 include various films stacked on inner surfaces of glass substrates. Polarizing plates are bonded to outer surfaces of the substrates 20 and 21.

As illustrated in FIG. 1, the CF substrate 20 has a short dimension smaller than that of the array substrate 21. The CF substrate 20 is bonded to the array substrate 21 with one of edges separated from each other in a direction along a short edge aligned with a corresponding edge of the array substrate 21. The other edge of the array substrate 21 on an opposite side in the direction along the short edge laterally projects from the CF substrate 20. A portion of the array substrate 21 not overlapping the CF substrate 20 is defined as a CF substrate non-overlapping portion 21A. Drivers 12 (signal sources) and a flexible substrate 13 (a signal transmission medium) are mounted on the CF substrate non-overlapping portion 21A. Each driver 12 includes an LSI chip that includes a driver circuit therein. The drivers 12 are mounted on the array substrate 21 with the chip on glass (COG) technology. The drivers 12 are configured to process various signals transmitted by the flexible substrate 13. In this embodiment, four drivers 12 are arranged at intervals along the X-axis direction in the non-display area NAA of the liquid crystal panel 11. The flexible substrate 13 includes a substrate made of a synthetic resin having an insulating property and flexibility (e.g., a polyimide-based resin) and a number of line patterns formed on the substrate. The flexible substrate 13 includes a first end connected to the non-display area NAA of the liquid crystal panel 11 and a second end connected to a control circuit board (a signal source). The various signals supplied by the control circuit board are transmitted to the liquid crystal panel 11 via the flexible substrate 13 and output to the display area AA after processed by the drivers 12 in the non-display area NAA. In the non-display area NAA of the array substrate 21, two gate circuits 14 (second signal sources) are disposed to sandwich the display area AA therebetween from sides with respect to the X-axis direction. The gate circuits 14 are configured to perform feedings of the scanning signals to gate lines 26, which will be described later. The gate circuits 14 are provided in a monolithic form on the array substrate 21.

The liquid crystal panel 11 according to this embodiment has the display function and the touch panel function. The display function is for displaying images. The touch panel function is for detecting positions of inputs (input positions) by a user based on displayed images. Touch panel patterns for the touch panel function are integrated (with the in-cell technology). The touch panel patterns use a projected capacitance method. The touch panel patterns use a self-capacitance method for detection. As illustrated in FIG. 1, the touch panel patterns include touch electrodes 30 (position detecting electrodes) arranged in a matrix within a plate surface of the liquid crystal panel 11. The touch electrodes 30 are disposed in the display area AA of the liquid crystal panel 11. The display area AA of the liquid crystal panel 11 substantially corresponds with a touch area (an input position detectable area), in which positions of inputs are detectable. The non-display area NAA substantially corresponds with a non-touch area (an input position non-detectable area), in which positions of inputs are not detectable. A finger of the user is a conductive member (a position input member). When the user brings his or her finger closer to a surface (a display surface) of the liquid crystal panel 11 to perform a position input operation based on an image displayed in the display area AA of the liquid crystal panel 11, a capacitor is formed between the finger and the touch electrode 30. A capacitance at the touch electrode 30 adjacent to the finger varies as the finger approaches thereto. The capacitance becomes different from a capacitance at the touch electrode 30 away from the finger. Therefore, the position of input can be detected based on the difference in capacitance. Lines of the touch electrodes 30 are arranged at intervals in the X-axis direction (a direction in which pixel electrodes 24 sandwiching touch lines 31 are arranged) and the Y-axis direction (a direction in which the touch lines 31 extend) to form the matrix in the display area AA. Each of the touch electrodes 30 has a rectangular shape in a plan view. A length of each side is some millimeters (e.g., from 2 mm to 6 mm). If one side of the touch electrodes 30 is 5 mm, sixty-nine touch electrodes 30 are included in each line along the long edge (in the X-axis direction) and thirty-nine touch electrodes 30 are included in each line along the short edge (in the Y-axis direction), that is, 2,691 touch electrodes 30 are provided. The touch electrodes 30 are significantly larger than pixels PX, which will be described later, when viewed in plan. Each of the touch electrodes 30 straddles multiple pixels PX (e.g., dozens of the pixels PX) in the X-axis direction and the Y-axis direction. The touch lines 31 (position detecting lines) are selectively connected to the touch electrodes 30 provided in the liquid crystal panel 11. The touch lines 31 extend in the Y-axis direction to cross the touch electrodes 30 arranged in the Y-axis direction. The touch lines 31 are selectively connected to the specific touch electrodes 30. The touch lines 31 are independently connected to the touch electrodes 30. The number of the touch lines 31 overlapping one touch electrode 30 is equal to the number of the touch electrodes 30 in the Y-axis direction. In FIG. 1, sections of the touch lines 31 connected to the touch electrodes 30 (contact holes CH2 and CH3, which will be described later) are indicated by black dots. The touch lines 31 are connected to detector circuits. The detector circuits may be included in the drivers 12 or provided outside the liquid crystal panel 11 and connected via the flexible substrate 13. In FIG. 1, the arrangement of the touch electrodes 30 is schematically illustrated. The number, the arrangement, and the two-dimensional shape of the touch electrodes 30 may be altered from those illustrated in FIG. 1 where appropriate.

Figure 2:
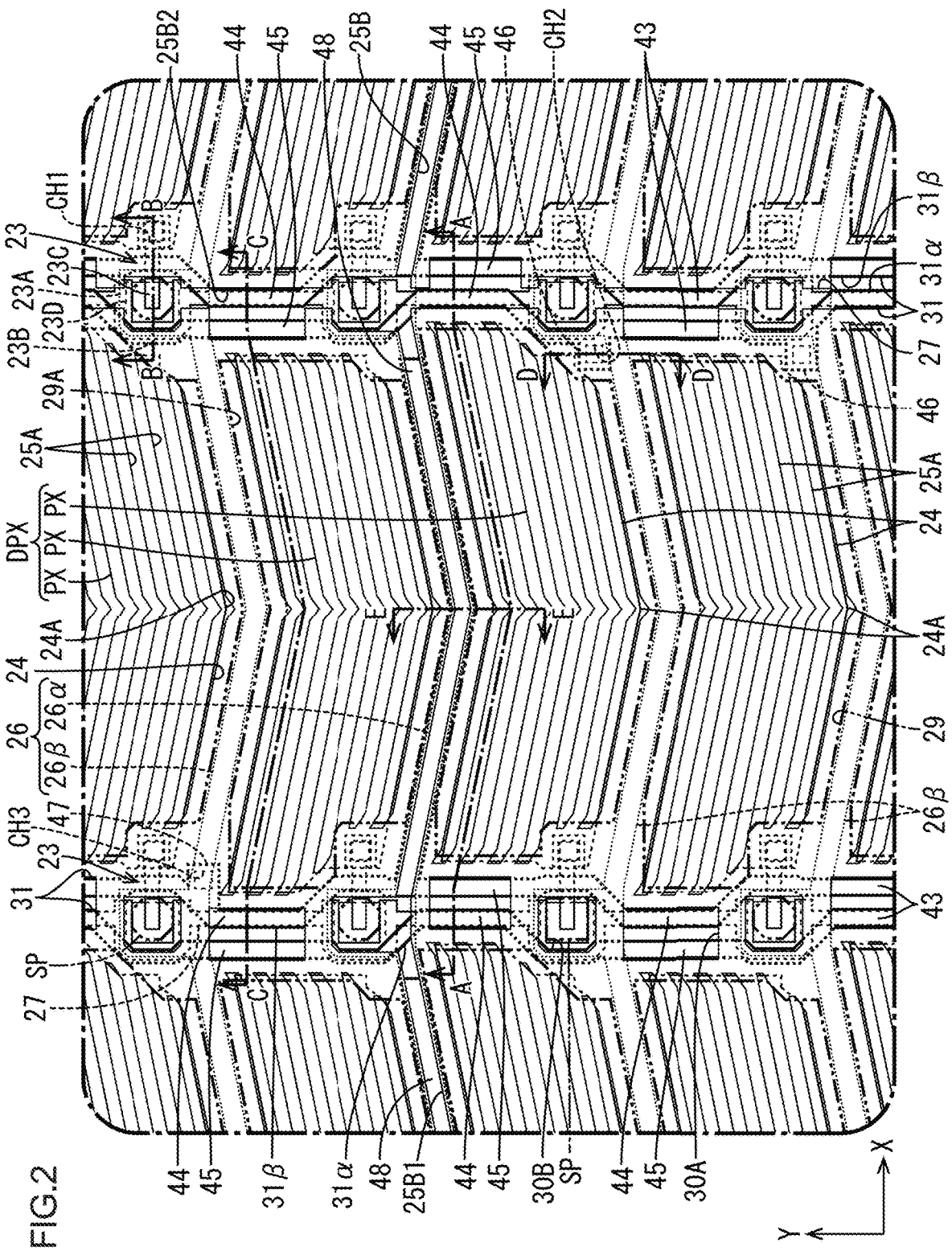
FIG. 2 is a plan view of the liquid crystal panel illustrating an arrangement of pixels.

FIG. 2 is a plan view of a section of the array substrate 21 and a section of the CF substrate 20 included in the liquid crystal panel 11 in the display area AA. As illustrated in FIG. 2, the touch electrodes 30 include touch line overlapping holes 30A (line overlapping holes) arranged to overlap sections of the touch lines 31. The touch line overlapping holes 30A extend in the Y-axis direction that corresponds with the direction in which the touch lines 31 extend. The touch line overlapping holes 30A are vertically long in a plan view (in an elongated form with a long dimension in the direction in which the touch lines 31 extend). The touch line overlapping holes 30A have a width (a dimension in the X-axis direction) larger than the width of the touch lines 31. With the touch line overlapping holes 30A overlapping at least sections of the corresponding touch lines 31, a parasitic capacitance between each touch line 31 and the touch electrodes 30 that are not connected to the touch line 31 can be reduced. Therefore, a proper level of sensitivity can be achieved in the position detection. The touch electrodes 30 include TFT overlapping holes 30B (switching component overlapping holes) arranged to overlap sections of TFTs 23, which will be described later. Spacers SP are disposed on the CF substrate 20 at positions overlapping the TFT overlapping holes 30B in the array substrate 21 to maintain a gap between substrates 20 and 21.

As illustrated in FIG. 2, thin film transistors (TFTs) 23 (pixel switch components) and pixel electrodes 24 are disposed on the inner surface of the array substrate 21, which is included in the liquid crystal panel 11, in the display area AA. Lines of the TFTs 23 and lines of the pixel electrodes 24 are arranged at intervals in the X-axis direction and the Y-axis direction to form a matrix. Around the TFTs 23 and the pixel electrodes 24, the gate lines 26 (second pixel lines, scanning lines) and the source lines 27 (pixel lines, signal lines, data lines) are routed substantially perpendicular to (to cross) each other. The gate lines 26 extend substantially in the X-axis direction. The source lines 27 extend substantially in the Y-axis direction. In this embodiment, the liquid crystal panel 11 is provided with the FHD and three colors of color filters 28 are repeatedly arranged along the source lines 27 (in the Y-axis direction), which will be described later. The number of the gate lines 26 is 1080×3=324. The number of the source lines 27 is 1,920. The gate lines 26 are connected to gate electrodes 23A of the TFTs 23. The source lines 27 are connected to source electrodes 23B of the TFTs 23. The pixel electrodes 24 are connected to drain electrodes 23C of the TFTs 23. The TFTs 23 turn on and off based on various signals supplied through the gate lines 26 and the source lines 27. The TFTs 23 controls application of voltages to the pixel electrodes 24 according to turn-on and turn-off of the TFTs 23. Each TFT 23 is disposed adjacent to one side of the pixel electrode 24 to which the TFT 23 is connected (on the left in FIG. 2).

As illustrated in FIG. 2, each of the pixel electrodes 24 has a rectangular shape in the plan view. A pixel electrode lengthwise direction corresponds with the X-axis direction and a pixel electrode widthwise direction corresponds with the Y-axis direction. A ratio of the long dimension of the pixel electrodes 24 to the short dimension of the pixel electrodes 24 is 3 to 1. Each gate line 26 is disposed between the pixel electrodes 24 adjacent to each other in the short dimension (the Y-axis direction). Each source line 27 is disposed between the pixel electrodes 24 adjacent to each other in the long dimension (the X-axis direction). The pixel electrodes 24 include bending portions 24A that have a bent shape in the plan view. The bending portions are located in the middle with respect to the long dimension. Specifically, each pixel electrode 24 is bent once at the middle to form a gentle V shape with ends thereof in the long dimension are slightly angled with respect to the X-axis direction and a peak form an obtuse angle. The bending portion 24A is located in the middle of the pixel electrode 24 with respect to the long dimension. The shape of the pixel electrode 24 in the plan view is as if two domains 24B having parallelogram shapes are connected to each other with the bending portion 24A as a boundary. The bending portion 24A is located at the boundary between the domains 24B. The bending portion 24A linearly extends in the short dimension of the pixel electrode 24 to connect bending points at side edges of the pixel electrode 24. The gate lines 26 disposed between the pixel electrodes 24 that are adjacent to each other in the short dimension are parallel to the long edges of the pixel electrodes 24. The gate lines 26 are bent multiple times and routed in zigzags along the side edges of the pixel electrodes 24. An interval between the gate lines 26 is about equal to the short dimension of the pixel electrodes 24. An interval between the source lines 27 is about equal to the long dimension of the pixel electrodes 24. In comparison to a configuration in which pixel electrodes have a vertically-long shape, the interval between the source lines 27 is about equal to division of the short dimension of the pixel electrodes 24 by the long dimension of the pixel electrodes 24 (e.g., about ⅓). The number of the source lines 27 per unit length in the X-axis direction is about equal to the division (e.g., about ⅓). In comparison to the configuration in which the pixel electrodes have the vertically-long shape, an interval between the gate lines 26 is about equal to division of the long dimension of the pixel electrodes 24 by the short dimension of the pixel electrodes 24 (e.g., about 3). The number of the gate lines 26 per unit length in the X-axis direction is about equal to the division (e.g., about 3). Because the number of the source lines 27 can be reduced, the number of image signals supplied to the source lines 27 can be reduced. A black matrix 29 (an inter-pixel light blocking portion) is formed on the CF substrate 20. The black matrix 29 is indicated by long dashed and double short dashed lines in FIG. 2. The black matrix 29 includes pixel holes 29A at positions overlapping large areas of the pixel electrodes 24 in the plan view to form a grid shape and to separate the adjacent pixel electrodes 24 from each other. Through the pixel holes 29A, light passing through the pixel electrodes 24 exits out of the liquid crystal panel 11. The black matrix 29 is disposed to overlap at least the TFTs 23, the gate lines 26, and the source lines 27 (including the touch lines 31) on the array substrate 21 in the plan view.

Figure 3:
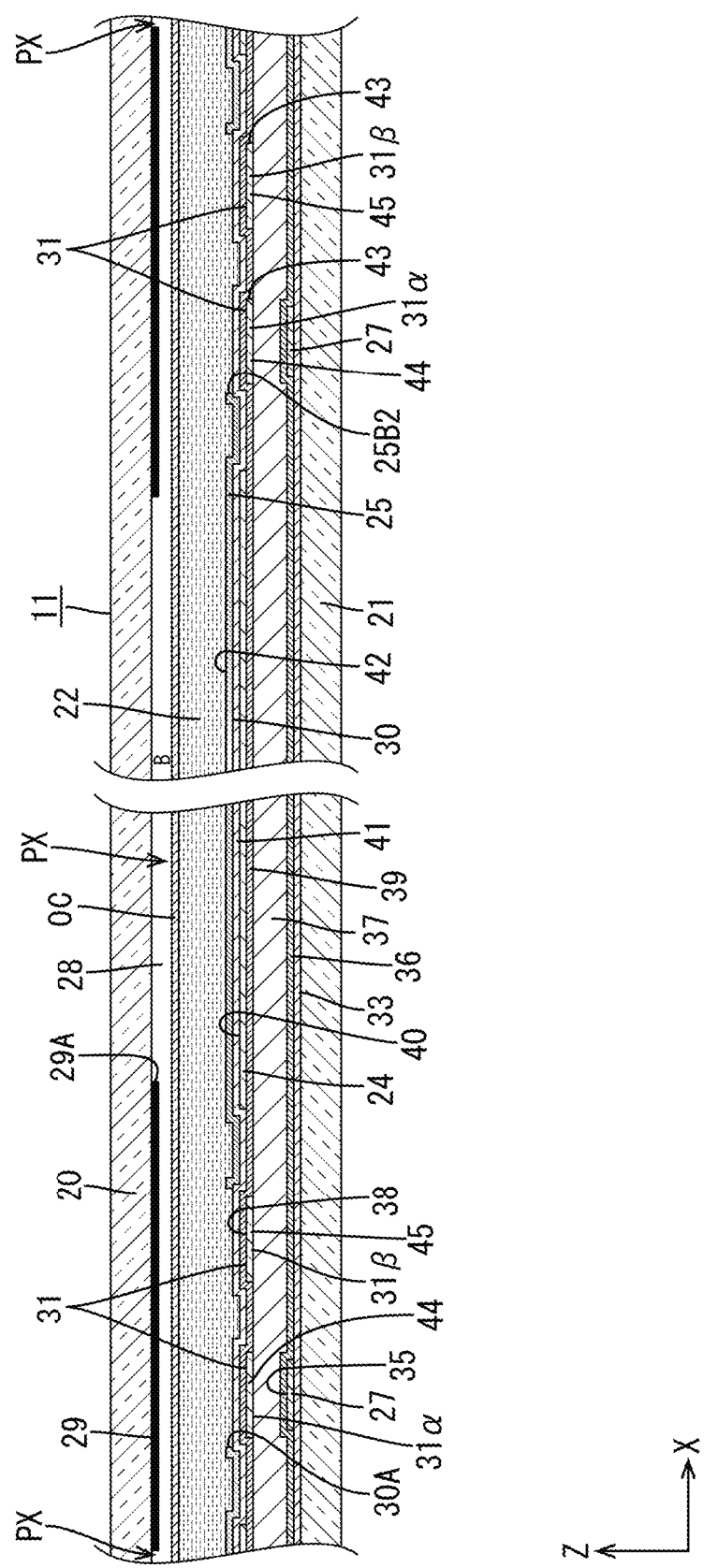
FIG. 3 is a cross-sectional view of the liquid crystal panel along line A-A in FIG. 2.

FIG. 3 is a cross-sectional view of a section of the liquid crystal panel 11 including the middle section of the pixel PX. As illustrated in FIG. 3, the liquid crystal panel 11 includes a liquid crystal layer 22 (a medium layer) disposed between the substrates 20 and 21. The liquid crystal layer 22 includes liquid crystal molecules. The liquid crystal molecules are substances having an optical characteristic that varies according to application of an electric field. In this embodiment, a liquid crystal material having positive dielectric constant anisotropy (a positive liquid crystal material) is used. Three colors of color filters 28 that exhibit blue (B), green (G), and red (R) are disposed on an inner surface side of the CF substrate 20 of the liquid crystal panel 11 in the display area AA. Lines of the color filters 28 are arranged in the X-axis direction and the Y-axis direction to form a matrix to overlap the pixel electrodes 24 on the array substrate 21 in the plan view. The color filters 28 that exhibit different colors are repeatedly arranged in lines along the source lines 27 (the Y-axis direction). The color filters 28 that exhibit the same color are arranged in lines along the gate lines 26 (the X-axis direction). In the liquid crystal panel 11, each R color filter 28, each G color filter 28, and the pixel electrode 24 that are arranged in the Y-axis direction and the pixel electrodes 24 that are opposed to the R, the G, and the B color filters 28 form three colors of the pixels PX. In the liquid crystal panel 11, the R, the G, and the B pixels PX arranged in the Y-axis direction form display pixels DPX for color display in predefined tones. Intervals between the pixels PX in the Y-axis direction are about 60 μm. Intervals between the pixels PX in the X-axis direction are about 180 μm. The black matrix 29 is formed in a grid pattern in the plan view to separate the adjacent color filters 28 that are opposed to the adjacent pixel electrodes 24. A planarization film OC is formed in a solid pattern in a layer upper than the color filters 28 (on the liquid crystal layer 22 side) for an about entire area of the CF substrate 20. Alignment films are formed on the innermost surfaces of the substrates 20 and 21 contacting the liquid crystal layer 22 for orienting the liquid crystal molecules includes in the liquid crystal layer 22.

Figure 4:
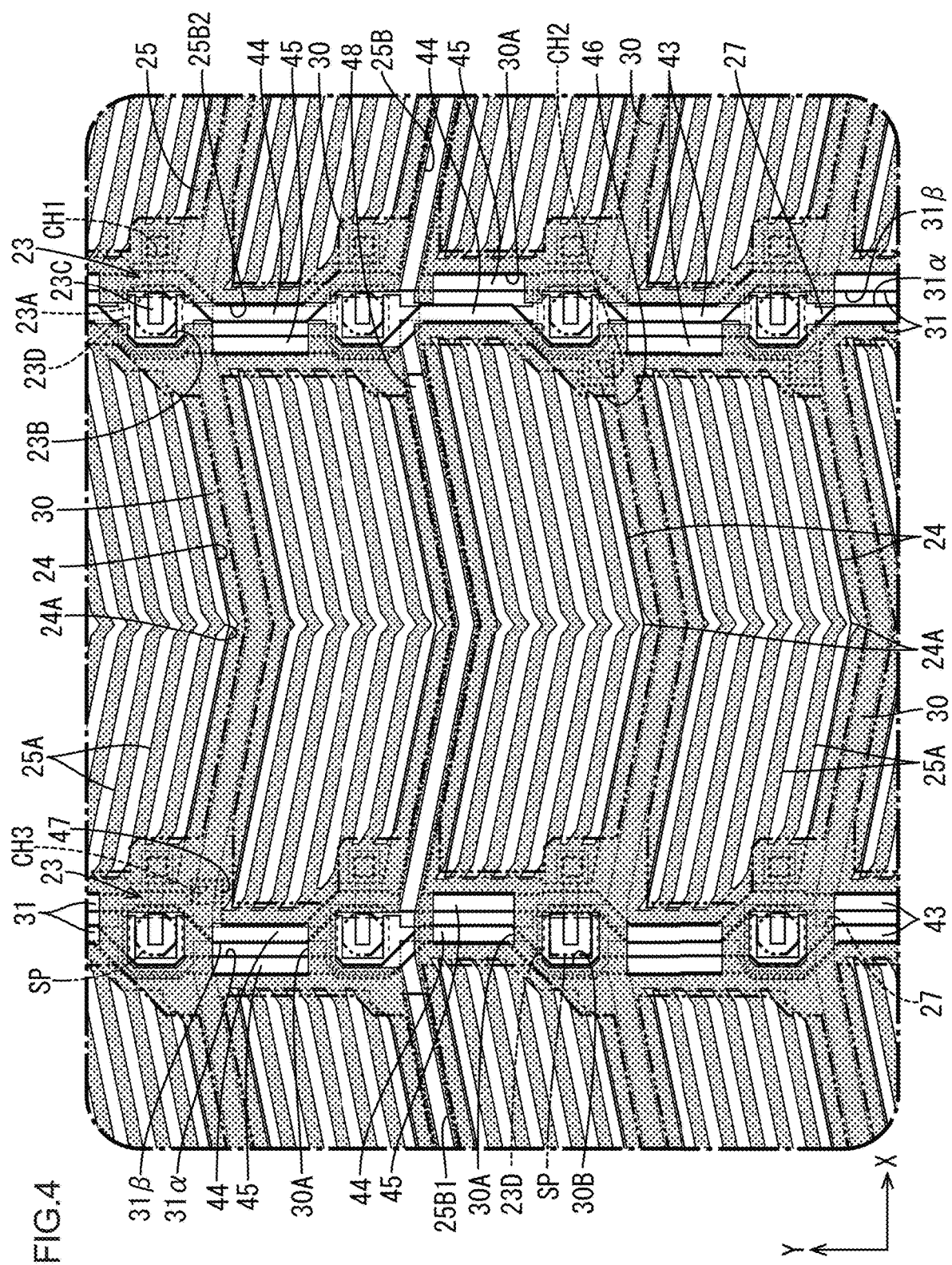
FIG. 4 is a plan view of an array substrate included in the liquid crystal panel illustrating a second transparent electrode film pattern.

Next, a common electrode 25 will be described with reference to FIGS. 2 to 4. FIG. 4 is a plan view of the array substrate 21 illustrating a pattern of the common electrode 25 (a second transparent electrode film 42, which will be described later). In FIG. 4, the second transparent electrode film 42 is indicated by hatching. As illustrated in FIGS. 2 to 4, the common electrode 25 is disposed in a layer upper than the pixel electrodes 24 on an inner surface side of the array substrate 21 in the display area AA to overlap all of the pixel electrodes 24. A constant reference voltage is normally supplied to the common electrode 25 except for periods for detecting positions of inputs by the finger, which is the position inputting member, (sensing periods). The common electrode 25 extends for the about entire display area AA. Sections of the common electrode 25 overlapping the pixel electrodes 24 include pixel overlapping voids 25A (pixel overlapping slits, orientation control slits). The pixel overlapping voids 25A extend in the pixel electrode lengthwise direction. The pixel overlapping voids 25A extend parallel to the long edges of the pixel electrodes 24 and bend in the middle (at about the middle). The number, the shape, and forming areas of the pixel overlapping voids 25A may be altered from those illustrated in the drawings where appropriate. When the pixel electrodes 24 are charged and differences are created between the pixel electrodes 24 and the common electrode 25 that overlap each other, fringe electric fields (oblique electric fields) are generated between edges of the pixel overlapping voids 25A and the pixel electrodes 24. Each fringe electric field includes a component along the plate surface of the array substrate 21 and a component in a normal direction to the plate surface of the array substrate 21. Using the fringe electric fields, the orientation of the liquid crystal molecules in the liquid crystal layer 22 can be controlled. The liquid crystal panel 11 in this embodiment is configured to operate in fringe field switching (FFS) mode. The pixel electrodes 24 in this embodiment have the elongated shape and include the bending portions 24A in the middle of the long dimension. Borders (hereinafter referred to as orientation borders) between regions in which orientations of the liquid crystal molecules based on the fringe electric fields that affect the liquid crystal layer 22 are different exit around the bending portions 24A of the pixel electrodes 24. Specifically, in this embodiment, the liquid crystal material having the positive dielectric constant anisotropy is used for the liquid crystal layer 22 and thus the liquid crystal molecules rotate counterclockwise on the left relative to the orientation borders in FIGS. 2 and 4 and clockwise on the right relative to the orientation borders in FIGS. 2 and 4. The control of the orientation of the liquid crystal molecules is difficult around the orientation borders. This may result in a lower level of contribution to the image display.

As illustrated in FIGS. 2 to 4, the common electrode 25 includes the touch electrodes 30 that are described earlier. The common electrode 25 includes partition voids 25B (partition slits) for partitioning the adjacent touch electrodes 30 (see FIG. 1) in addition to the pixel overlapping voids 25A that are described earlier. The partition voids 25B include first void portions 25B1 and second void portions 25B2 to form a grid as a whole in the plan view. The first void portions 25B1 extend horizontally across the common electrode 25 for an entire dimension in the X-axis direction to separate the touch electrodes 30 that are adjacent to each other in the Y-axis direction. The second void portions 25B2 extend vertically across the common electrode 25 for an entire dimension in the Y-axis direction to separate the touch electrodes 30 that are adjacent to each other in the X-axis direction. The first void portions 25B1 are arranged to overlap the gate lines 26 disposed between the touch electrodes 30 that are adjacent to each other in the Y-axis direction. The gate lines 26 include void overlapping gate lines 26α (void overlapping pixel lines) disposed to overlap the first void portions 25B1 and void non-overlapping gate lines 2613 disposed not to overlap the first void portions 25B1. Hereinafter, the suffix α is included in the symbol for the first gate lines and the suffix β is included in the symbol for the second gate lines when they are distinguished from each other. The suffixes are not included in the symbols when they are not distinguished from each other. The second void portions 25B2 are disposed to overlap the source lines 27 disposed between the touch electrodes 30 that are adjacent to each other in the X-axis direction. The common electrode 25 includes the touch electrodes 30 that are separated from each other by the partition voids 25B and arranged in the grid in the plan view. The touch electrodes 30 are insulated from each other. The common signals (the reference voltage signals) related to the display function and the touch signals related to the touch panel function are transmitted to the touch electrodes 30 through the touch lines 31 at different timings (through time division multiplexing). The common signals are transmitted to all of the touch lines 31 at the same timing and thus all of the touch lines 31 are held at the reference potential and function as the common electrode 25.

Figure 5:
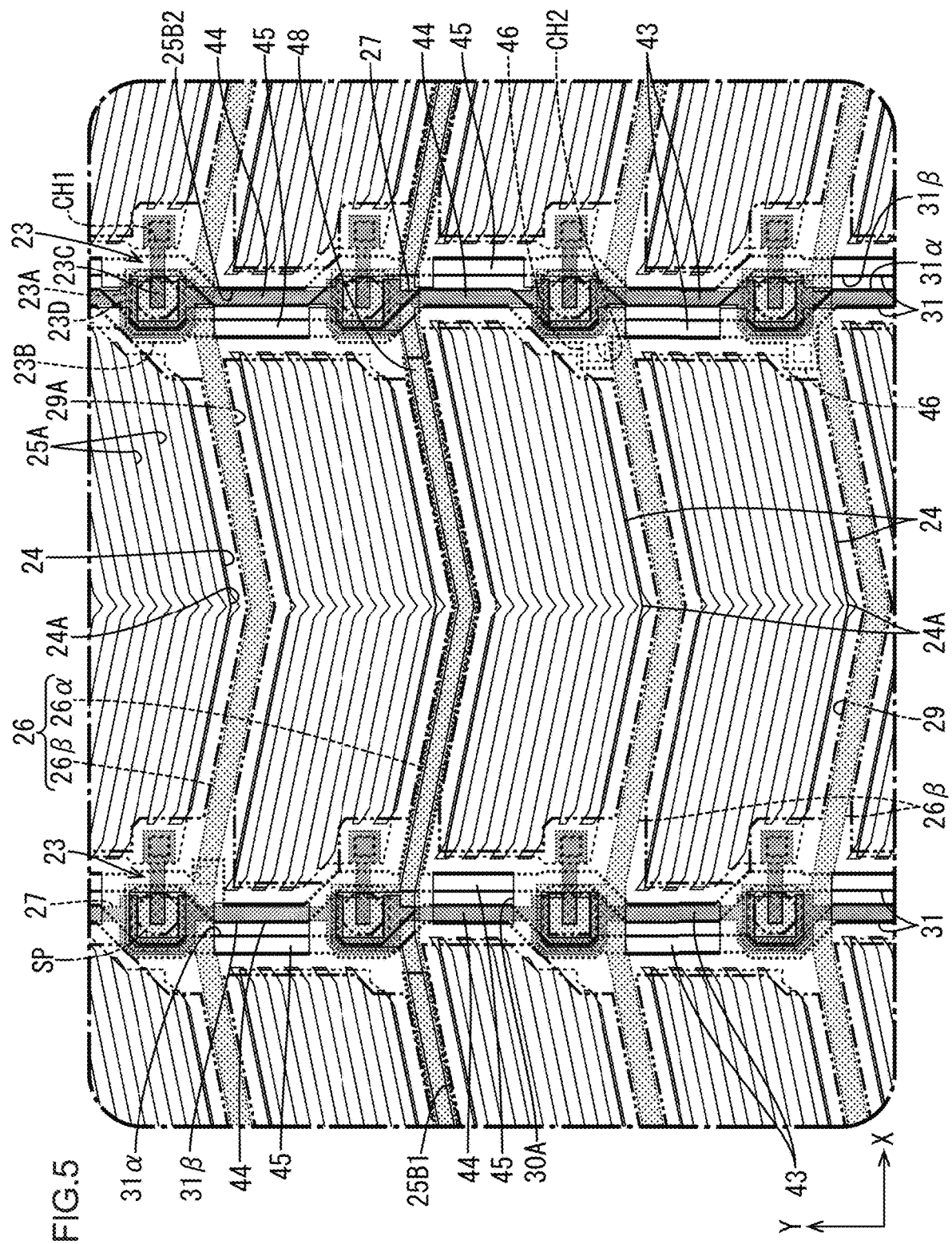
FIG. 5 is a plan view of the array substrate illustrating a first metal film pattern and a second metal film pattern.

Configurations of the TFTs 23 will be described in detail with reference to FIG. 5. FIG. 5 is a plan view of the array substrate 21 illustrating patterns including the electrodes 23A to 23C, the gate lines 26, and the source lines 27 (a first metal film 32 and a second metal film 35, which will be described later). In FIG. 5, the first metal film 32 and the second metal film 35 are indicated by hatching. As illustrated in FIG. 2, the TFTs 23 include the gate electrodes 23A that branch out from the gate lines 26. Sections of the gate lines 26 crossing the source lines 27 are projected in the Y-axis direction toward the pixel electrodes 24 and defined as the gate electrodes 23A. Each of the gate electrodes 23A has a rectangular shape. The scanning signals transmitted through the gate lines 26 are supplied to the gate electrodes 23A. The TFTs 23 include the source electrodes 23B that include sections of the source lines 27 overlapping the gate electrodes 23A. Each of the source lines 27 include a section overlapping the corresponding gate line 26 bending along three edges of the gate electrode 23A to form a channel shape with an opening on the pixel electrode 24 side in the plan view. The section is defined as the source electrode 23B. The section of the source line 27 defined as the source electrode 23B is bent to an opposite side from the pixel electrode 24 connected to the source line 27 (on the left in FIG. 4) and go around the pixel electrode 24 to avoid interference (short circuit) with a drain electrode 23C, which will be described later. The TFTs 23 include drain electrodes 23C separated from the source electrodes 23B. Each drain electrode 23C is opposed to three edges of the corresponding source electrode 23B. Each drain electrode 23C includes an end overlapping a section (a corner) of the corresponding pixel electrode 24 in the plan view and connected to the section. The TFTs 23 include the channels 23D overlapping the gate electrodes 23A and connected to the source electrodes 23B and the drain electrodes 23C. Each of the channels 23D has a rectangular shape similar to the shape of the gate electrodes 23A in the plan view. Sections of each channel 23D including three edges are connected to the corresponding source electrode 23B and a section including the other edge is connected to the corresponding drain electrode 23C. When the TFTs 23 turn on based on the scanning signals supplied to the gate electrodes 23A, the image signals (the signals, the data signals) supplied to the source lines 27 are supplied to the drain electrodes 23C via the source electrodes 23B and the channels 23D. As a result, the pixel electrodes 24 are charged. The common electrode 25 includes the TFT overlapping holes 30B at the positions overlapping the channels 23D of the TFTs 23 (see symbol 30B in FIG. 4). The TFT overlapping holes 30B are provided for reducing variations in leak current between the source electrodes 23B and the drain electrodes 23C. This may result from variations in voltage at the common electrode 25 (the touch electrodes 30) during periods in which the TFTs 23 are turned off including the sensing periods.

Figure 6:
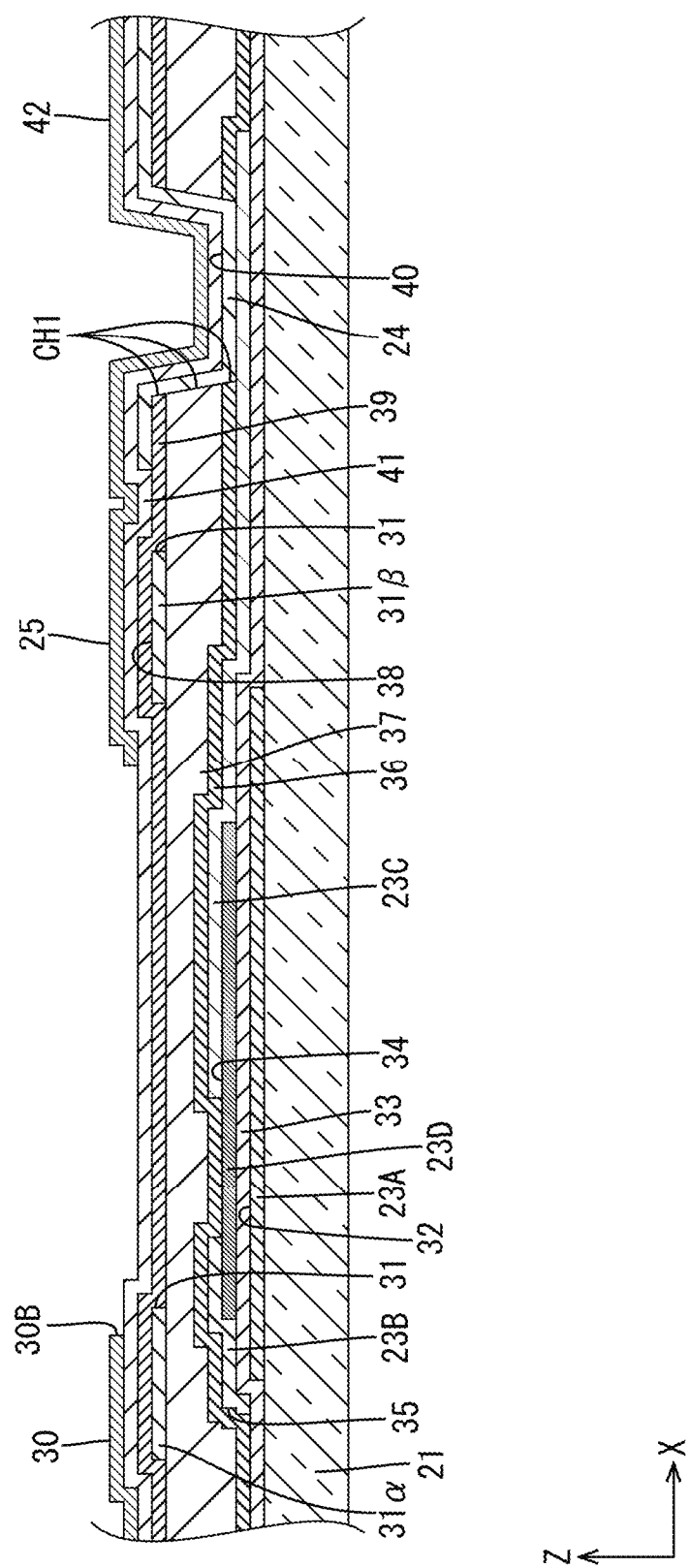
FIG. 6 is a cross-sectional view of the array substrate along line B-B in FIG. 2.

Various films stacked on the inner surface side of the array substrate 21 will be described with reference to FIG. 5. FIG. 6 is a cross-sectional view of a section of the array substrate 21 including the TFT 23. As illustrated in FIG. 6, on the array substrate 21, the first metal film 32, a gate insulator 33 (an insulator), a semiconductor film 34, the second metal film 35, a first interlayer insulator 36 (an insulator), a planarization film 37 (an insulator), a third metal film 38, a second interlayer insulator 39 (an insulator), a first transparent electrode film 40, an inter-electrode insulator 41 (an insulator), and the second transparent electrode film 42 are stacked in this sequence from a lower layer side on the array substrate 21. Each of the first metal film 32, the second metal film 35, and the third metal film 38 may be a single-layer film made of one kind of metal selected from copper, titanium, aluminum, molybdenum, and tungsten, a multi-layer film made of different kinds of metals, or an alloy to have conductivity and a light blocking property. The gate lines 26 and the gate electrodes 23A of the TFTs 23 may be prepared from the first metal film 32. The source lines 27 and the source electrodes 23B and the drain electrodes 23C of the TFTs 23 may be prepared from the second metal film 35. The touch lines 31 may be prepared from the third metal film 38. The semiconductor film 34 may be a thin film made of a semiconductor material such as an oxide semiconductor material and an amorphous silicon material. The channels 23D of the TFTs 23 may be prepared from the semiconductor film 34. The first transparent electrode film 40 and the second transparent electrode film 42 may be made of a transparent electrode material (e.g., indium tin oxide (ITO)) or indium zinc oxide (IZO)). The pixel electrodes 24 may be prepared from the first transparent electrode film 40. The common electrode 25 (the touch electrodes 30) are prepared from the second transparent electrode film 42.

The gate insulator 33, the first interlayer insulator 36, the second interlayer insulator 39, and the inter-electrode insulator 41 are made of inorganic materials such as silicon nitride ($SiN_x$) and silicon oxide ($SiO_2$). The planarization film 37 is made of an organic material such as PMMA (an acrylic resin material). The thickness of the planarization film 37 is larger than the thicknesses of other insulators 33, 36, 39 and 41 made of the inorganic materials. With the planarization film 37, a surface of the array substrate 21 is planarized. The gate insulator 33 insulates the first metal film 32 in the lower layer from the semiconductor film 34 and the second metal film 35 in the upper layers. The first interlayer insulator 36 and the planarization film 37 insulate the semiconductor film 34 and the second metal film 35 in the lower layers from the third metal film 38 in the upper layer. Sections of the first interlayer insulator 36 and the planarization film 37 overlapping both the drain electrodes 23C and the pixel electrodes 24 include pixel contact holes CH1 for connecting the drain electrodes 23C to the pixel electrodes 24. The second interlayer insulator 39 insulates the third metal film 38 in the lower layer from the first transparent electrode film 40 in the upper layer. The inter-electrode insulator 41 insulates the first transparent electrode film 40 in the lower layer from the second transparent electrode film 42 in the upper layer.

Figure 7:
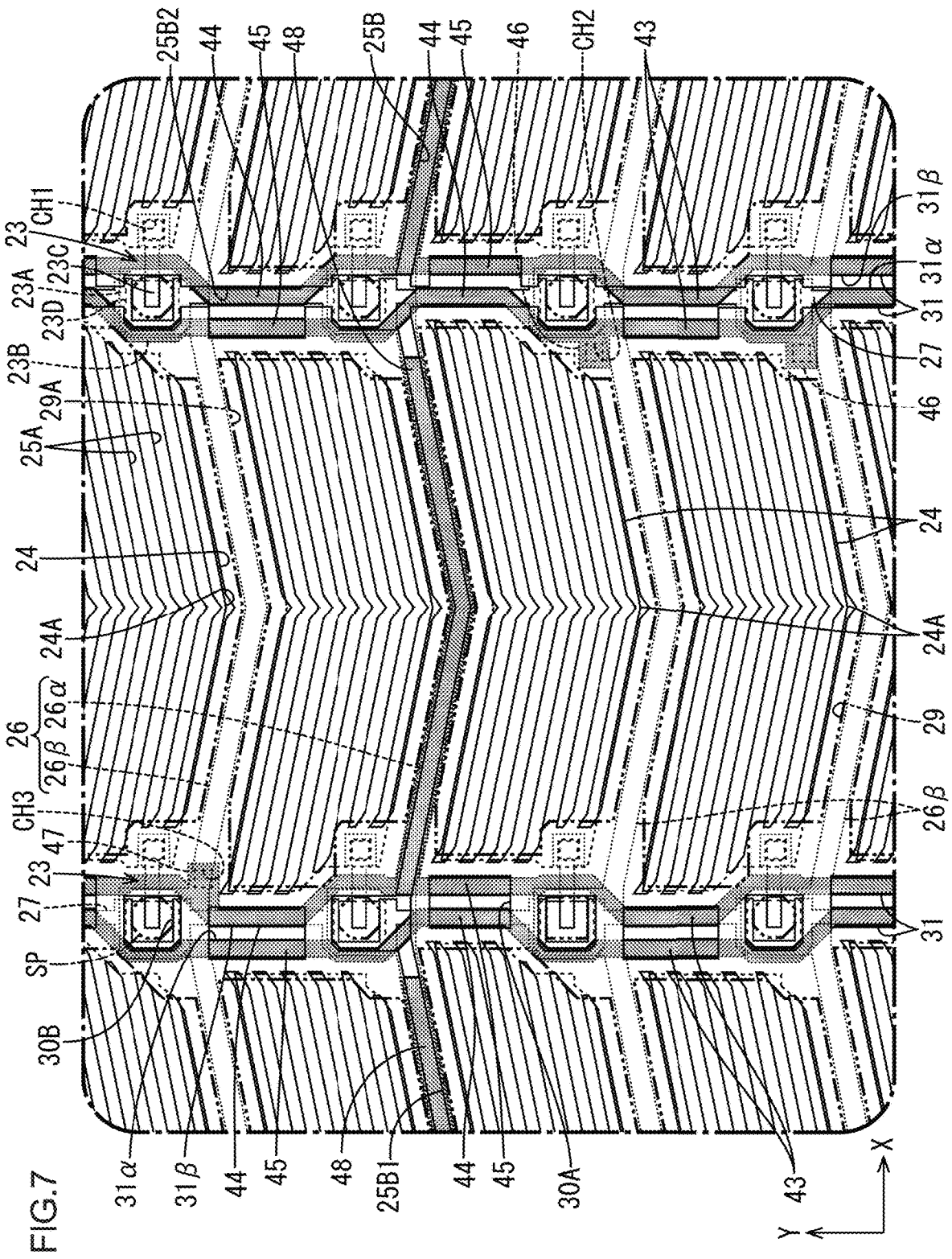
FIG. 7 is a plan view of the array substrate illustrating a third metal film pattern.

Next, a configuration of the touch lines 31 in the display area AA will be described with reference to at least FIG. 7. FIG. 7 is a plan view of the array substrate 21 illustrating a pattern of the third metal film 38 from which the touch lines 31 are prepared. In FIG. 7, the third metal film 38 is indicated by hatching. As illustrated in FIG. 7, each of the touch lines 31 is disposed in a space adjacent to the corresponding pixel electrode 24 on a side on which the source line 27 to which the pixel electrode 24 is connected is disposed. The touch lines 31 extend in the Y-axis direction. Spaces adjacent to the pixel electrodes 24 in the X-axis direction include spaces in which the TFTs 23 (sections of the source lines 27 configured as source electrodes 23B) are disposed and spaces in which the TFTs 23 are not disposed and sections of the source lines 27 other than the source electrodes 23B are disposed. The spaces are arranged alternately and repeatedly in the Y-axis direction. The touch lines 31 extend in the Y-axis direction in spaces adjacent to the pixel electrodes 24 in the X-axis direction. The touch lines 31 include sections disposed adjacent to the pixel electrodes 24 to cross the TFTs 23 and sections disposed adjacent to the pixel electrodes 24 without crossing the TFTs 23.

As illustrated in FIG. 7, two touch lines 31 are disposed adjacent to the pixel electrodes 24 on a side on which the source lines 27 to which the pixel electrodes 24 are connected are disposed with a gap therebetween. Specifically, two touch lines 31 are disposed adjacent to the pixel electrodes 24 arranged in the X-axis direction on the side on which the source line 27 to which the pixel electrodes 24 are connected is disposed with respect to the X-axis direction (on the left in FIG. 7). The number of the touch lines 31 is about double the number of the source lines 27, that is, 3,840. The number of the touch lines 31 is larger than the number of the touch electrodes 30, which is 2,691. The touch lines 31 are connected to all the touch electrodes 30. The number of the touch electrodes 30 may be set equal to the number of the touch lines 31. A size (or a length of each edge) of each touch electrode 30 can be reduced. Therefore, definition in sensing (position detection) improves. Two touch lines 31 and one source line 27 adjacent to multiple pixel electrodes 24 are sandwiched between the pixel electrodes 24 that are adjacent to each other in the X-axis direction in the display area AA although two touch lines 31 and one source line 27 adjacent to a line of the pixel electrodes 24 at the leftmost in FIG. 1 are not sandwiched.

As illustrated in FIG. 7, two touch lines 31 adjacent to the pixel electrodes 24 on the side on which the source line 27 to which the pixel electrodes 24 are connected is disposed include common portions 43 that have the same positional relation to the source line 27. Specifically, the touch lines 31 are differently routed and each of the touch lines 31 includes overlapping portions that overlap the source line 27 and non-overlapping portions that do not overlap the source line 27. The common portions are included in the overlapping portions and the non-overlapping portions. According to the configuration, if parasitic capacitances appear between the common portions 43 of the touch lines 31 and the source line 27, the parasitic capacitances are about equal because the positional relations of the common portions 43 to the source line 27 are the same. Therefore, differences in parasitic capacitance are less likely to be created between the touch lines 31 and the source line 27. Sensing accuracy (position detection accuracy) or display quality is less likely to be reduced due to the differences in parasitic capacitance. The common portions 43 include line overlapping common portions 44 and line non-overlapping common portions 45. The line overlapping common portions 44 are disposed to overlap the source lines 27 in the plan view. The line non-overlapping common portions 45 are disposed to overlap the source lines 27. Because the line overlapping common portions 44 included in the common portions 43 are disposed to overlap the source lines 27, two touch lines 31 and the source line 27 can be efficiently arranged. A reduction in aperture rate, which may result from a large number of the touch lines 31, can be further reduced. In comparison to a configuration in which the common portions include only the line overlapping common portions, the line non-overlapping common portions 45 included in the common portions 43 and overlapping the source lines 27 can provide larger areas having the same positional relation to the source lines 27. According to the configuration, the differences in parasitic capacitance are further less likely to be created between the touch lines 31 and thus the reduction in display quality is further properly reduced.

Hereinafter, the suffix α is included in the symbol for the first touch line of two touch lines 31 adjacent to the pixel electrodes 24 on the side on which the source line 27 to which the pixel electrodes 24 are connected is disposed on the left in FIG. 7 and the suffix β is included in the symbol for the second touch line on the right in FIG. 7 when they are distinguished from each other. The suffixes are not included in the symbols when they are not distinguished from each other. As illustrated in FIG. 7, the pixel electrodes 24 are sandwiched between the second touch line 31β and the first touch line 31α. The second touch line 31β is adjacent to the pixel electrodes 24 on the side on which the source line 27 to which the pixel electrodes 24 are connected is disposed (on the left in FIG. 7). The first touch line 31α is adjacent to the pixel electrodes 24 on the side on which the source line 27 to which the pixel electrodes 24 are not connected is disposed (on the right in FIG. 7). The second touch line 31β is disposed between the pixel electrodes 24 and the first touch line 31α on the side on which the source line 27 to which the pixel electrodes 24 are connected is disposed with the gap. The first touch line 31α is disposed between the pixel electrodes 24 and the second touch line 31β on a side on which the source line 27 to which the pixel electrodes 24 are not connected is disposed with a gap. The first touch line 31α and the second touch line 31β are prepared from the third metal film 38. According to the configuration, line resistances of the first touch line 31α and the second touch line 31β are about equal to each other. Therefore, characteristics of the signals supplied to the touch electrodes (the common electrode 25) are equalized. This configuration is preferable for maintaining the sensing sensitivity (the display quality) at a high level.

As illustrated in FIG. 7, the portions of the first touch line 31α and the second touch line 31β adjacent to the pixel electrodes 24 and crossing the TFTs 23 are non-common portions. The portions of the first touch line 31α and the second touch line 31β adjacent to the pixel electrodes 24 and not crossing the TFTs 23 are the common portions 43. The portions of the first touch line 31α and the second touch line 31β not in common will be described. The non-common portions of the first touch line 31α adjacent to the pixel electrodes 24 and crossing the TFTs 23 overlap sections of the source electrodes 23B of the TFTs 23 and bend along the source electrodes 23B. The portions of the second touch line 31β adjacent to the pixel electrodes 24 and crossing the TFTs 23 overlap sections of the drain electrodes 23C of the TFTs 23 to be substantially perpendicular to the drain electrodes 23C. The portions of the first touch line 31α and the second touch line 31β adjacent to the pixel electrodes 24 and crossing the TFTs 23 are disposed not to overlap the channels 23D of the TFTs 23.

Figure 8:
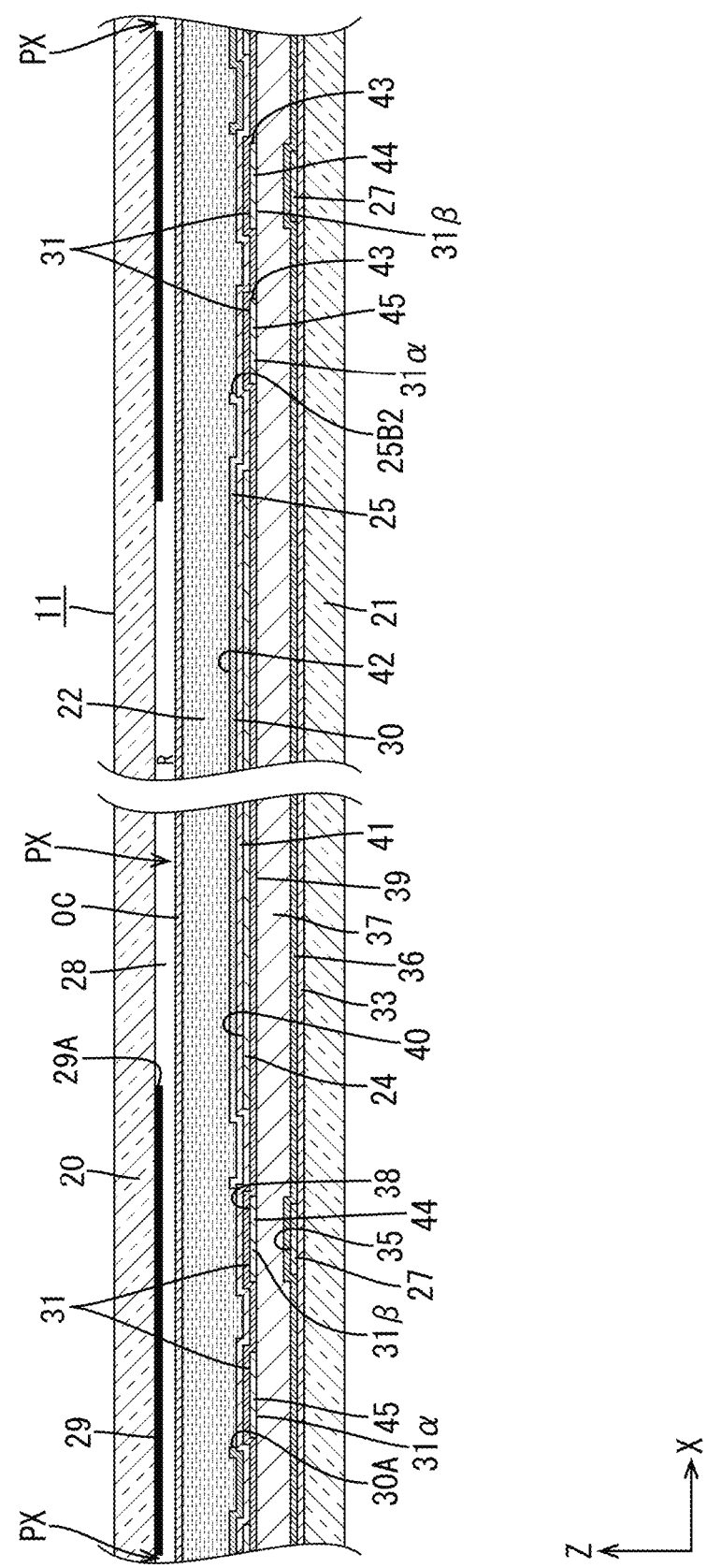
FIG. 8 is a cross-sectional view of the array substrate along line C-C in FIG. 2.

Next, the common configuration of the first touch lines 31α and the second touch lines 31β, that is, the configuration of the common portions 43 will be described. As illustrated in FIG. 7, the common portions 43 of the first touch lines 31α and the second touch lines 31β include the line overlapping common portions 44 and the line non-overlapping common portions 45. The line overlapping common portions 44 and the line non-overlapping common portions 45 linearly extend in the Y-axis direction and have a length smaller than the short dimension of the pixel electrodes 24. As illustrated in FIGS. 3 and 7, the line overlapping common portions 44 of the first touch lines 31α and the line non-overlapping common portions 45 of the second touch lines 31β are separated from each other in the X-axis direction. The line non-overlapping common portion 45 of the first touch lines 31α and the line overlapping common portions 44 of the second touch lines 318 are separated from each other in the X-axis direction. FIG. 8 is a cross-sectional view of a section of the liquid crystal panel including a middle section of the pixel PX adjacent to the pixel PX in FIG. 3 in the Y-axis direction. Each touch line overlapping hole 30A in each touch electrode 30 has a width to straddle the line overlapping common portion 44 and the line non-overlapping common portion 45 of the first touch lines 31α and the second touch lines 31β adjacent to each other. As illustrated in FIGS. 3 and 8, the line overlapping common portions 44 of the first touch lines 31α and the second touch lines 31β are disposed to overlap the source lines 27 via the first interlayer insulator 36 and the planarization film 37 (the insulator). As illustrated in FIG. 7, the line non-overlapping line portions 45 of the first touch lines 31α are disposed on an opposite side (on the left in FIG. 7) from the pixel electrodes 24 to which the source lines 27 are connected to relative to the line overlapping line portions 44 of the second touch lines 31β (the source lines 27). The line non-overlapping line portions 45 are not disposed between the source lines 27 and the pixel electrodes 24 to which the source lines 27 are connected. Therefore, larger areas are provided for the pixel electrodes 24 because spaces are not required for the line non-overlapping line portions 45. The line non-overlapping common portions 45 of the second touch lines 31β are disposed on the side on which the pixel electrodes 24 to which the source lines 27 are connected (on the right in FIG. 7) relative to the line overlapping common portions 44 of the first touch lines 31α (the source lines 27). The line non-overlapping common portions 45 are disposed between the source lines 27 and the pixel electrodes 24 to which the source lines 27 are connected. Therefore, areas provided for the pixel electrodes 24 are reduced by spaces for the line non-overlapping common portions 45. Each pixel electrode 24 is horizontally asymmetric in the plan view. The area of one of the domains 24B of the pixel electrode 24 adjacent to the line overlapping common portion 44 is larger than the area of the other domain 24B adjacent to the line non-overlapping common portion 45. The area of the domain 24B adjacent to the line non-overlapping common portion 45 is smaller than the area of the domain 24B adjacent to the line overlapping common portion 44. An amount of light transmitting through the domain 24B having the larger area tends to be larger than an amount of light transmitting through the domain 24B having the smaller area.

As illustrated in FIG. 7, the line overlapping common portions 44 of the first touch lines 31α and the line overlapping common portions 44 of the second touch lines 31β are alternately and repeatedly arranged in the Y-axis direction. The line non-overlapping common portions 45 of the first touch lines 31α and the line non-overlapping common portions 45 of the second touch lines 31β are alternately and repeatedly arranged in the Y-axis direction. The first touch lines 31α and the second touch lines 31β are routed to extend substantially in the Y-axis direction and repeatedly bend in zigzags in some sections. The first touch lines 31α and the second touch lines 31β are disposed such that the intervals between the line overlapping common portions 44 and the intervals between the line non-overlapping common portions 45 are slightly larger than the intervals between the pixel electrodes 24 with respect to the Y-axis direction. The line overlapping common portions 44 and the line non-overlapping common portions 45 of each touch line 31 are alternately and repeatedly arranged in the Y-axis direction for every pixel PX. Two pixel electrodes 24 adjacent to each other in the Y-axis direction are horizontally inverted from each other in the plan view in FIG. 7. The domain 24B of one of the pixel electrodes 24 adjacent to each other in the Y-axis direction on the left in FIG. 7 has the area larger than the area of the domain 24B on the right. The domain 24B of the other pixel electrode 24 on the right has the area larger than the area of the domain 24B on the left. Even if a difference is created between the amount of light transmitting through the domain 24B adjacent to the line overlapping common portion 44 and having the larger area and the amount of light transmitting through the domain 24B adjacent to the line non-overlapping common portion 45 and having the smaller area, the difference in amount of the transmitting light is less likely to be recognized because of the arrangement of the pixel electrodes 24 in the Y-axis direction. If the pixel size is larger than the pixel size described above (e.g., the short dimension is about 80 µm and the long dimension is about 240 µm), the difference in amount of the transmitting light between the domain 24B having the larger area and the domain 24B having smaller area is more likely to be recognized. Even the pixels are provided in such a size, the difference in amount of the transmitting light is less likely to be recognized according to the arrangement described above. Therefore, the display quality is maintained at the high level.

Figure 9:
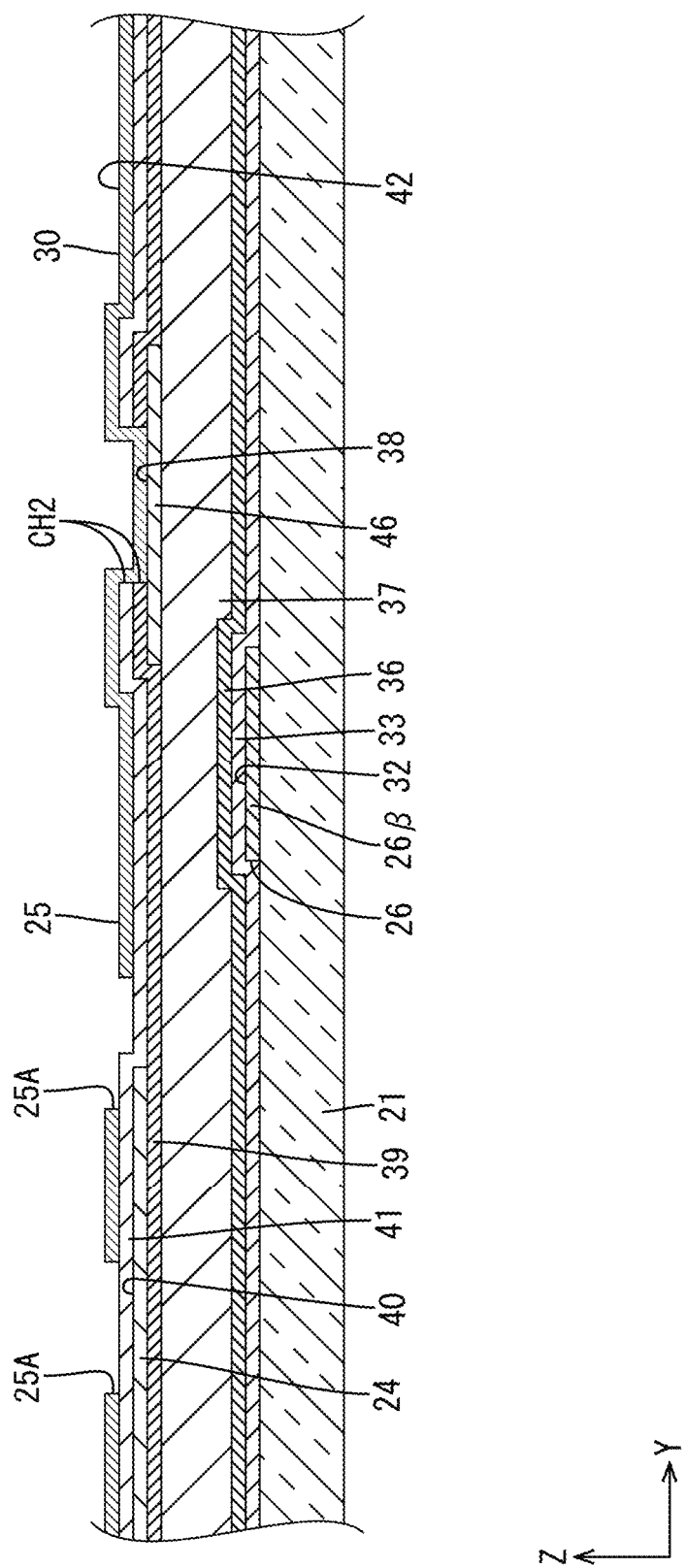
FIG. 9 is a cross-sectional view of the array substrate along line D-D in FIG. 2.

As illustrated in FIGS. 7 and 9, the first touch lines 31α include first connecting portions 46 disposed to overlap the touch electrodes 30 (the common electrode 25) and connected to the touch electrodes 30. FIG. 9 is a cross-sectional view of a section of the array substrate 21 including the first connecting portion 46. Each first connecting portion 46 is disposed adjacent to the TFT 23 to which the source line 27 adjacent to the first touch line 31α is connected on an opposite side from a connecting structure (the pixel contact hole CH1) through which the TFT 23 is connected to the pixel electrode 24 in the X-axis direction. The first connecting portion 46 of the first touch line 31α prepared from the third metal film 38 is connected to the touch electrode 30 prepared from the second transparent electrode film 42 via the first contact holes CH2 drilled through the second interlayer insulator 39 and the inter-electrode insulator 41 disposed between the third metal film 38 and the second transparent electrode film 42. As illustrated in FIG. 7, the second touch lines 31β include second connecting portions 47 disposed to overlap the touch electrodes 30 (the common electrode 25) and connected to the touch electrodes 30. Each second connecting portion 47 is disposed adjacent to the TFT 23 to which the source line 27 adjacent to the second touch line 31β is connected on an opposite side from a connecting structure (the pixel contact hole CH1) through which the TFT 23 is connected to the pixel electrode 24 in the X-axis direction. The second connecting portion 47 of the second touch line 31β prepared from the third metal film 38 is connected to the touch electrode 30 prepared from the second transparent electrode film 42 via the second contact holes CH3 drilled through the second interlayer insulator 39 and the inter-electrode insulator 41 disposed between the third metal film 38 and the second transparent electrode film 42. The shapes of the second connecting portions 47 and the second contact holes CH3 in the cross-sectional view are similar to the shapes of the first connecting portions 46 and the first contact holes CH2 in FIG. 9.

Figure 10:
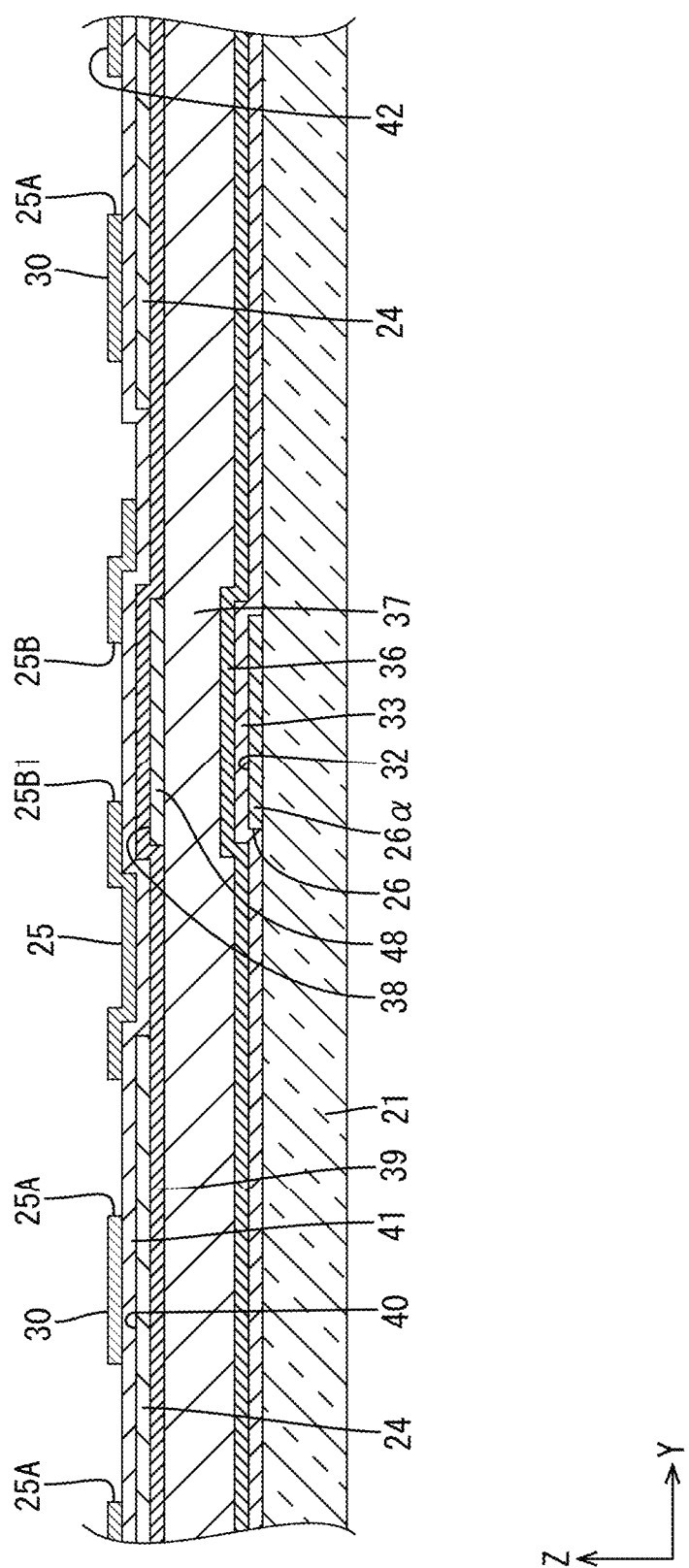
FIG. 10 is a cross-sectional view of the array substrate along line E-E in FIG. 2.

As illustrated in FIG. 7, shielding portions 48 are electrically connected to the second touch lines 31β. The shielding portions 48 are disposed to overlap and the void overlapping gate lines 26α of the gate lines 26. The void overlapping gate lines 26α have a strip shape with a constant width and extend parallel to the void overlapping gate lines 26α (in the pixel electrode lengthwise direction). The shielding portions 48 are disposed to overlap the first void portions 25B1 of the partition voids 25B. The width of the shielding portions 48 is slightly larger than the width of the void overlapping gate lines 26α or the width of the first void portions 25B1. The width of the shielding portions 48 is smaller than the interval between the pixel electrodes 24 that are adjacent to each other in the Y-axis direction. The shielding portions 48 are disposed not to overlap the pixel electrodes 24. The shielding portions 48 are prepared from the third metal film 38 from which the second touch lines 31β are prepared and directly coupled to the second touch lines 31β. The shielding portions 48 extend from the second touch lines 31β to the right in FIG. 7 along the void overlapping gate lines 26α. Each shielding portions 48 has a gentle V shape with an obtuse vertex angle along the long edge of the corresponding pixel electrode 24. A distal end of each shielding portion 48 is disposed adjacent to the TFT 23 over which the first touch line 31α crosses. The first touch line 31α and the second touch line 31β that is connected to the shielding portion 48 sandwich the pixel electrodes 24. Each shielding portion 48 is disposed between the touch electrodes 30 that are adjacent to each other in the Y-axis direction. As illustrated in FIG. 10, the gate insulator 33, the first interlayer insulator 36, and the planarization film 37 are disposed between the shielding portions 48 prepare from the third metal film 38 and the void overlapping gate lines 26α prepared from the first metal film 32, that is, the shielding portions 48 are insulated from the void overlapping gate lines 26α. FIG. 10 is a cross-sectional view of a section of the array substrate including the shielding portion 48. According to the configuration, electric fields created between the void overlapping gate lines 26α and the edges of the touch electrodes 30 on the first void portion 25B1 side are properly blocked by the shielding portions 48 that overlap the void overlapping gate lines 26α. A reduction in display quality, which may result from the electric fields around the edges of the touch electrodes 30 on the first void portion 25B1 side, can be reduced. Furthermore, with the shielding portions 48 overlapping the void overlapping gate lines 26α, a reduction in aperture rate, which may result from the shielding portions 48, is less likely to occur.

As described above, the liquid crystal display device 10 (the display device) according to this embodiment includes the pixel electrodes 24, the common electrode 25, the TFTs 23 (the switching components), the source lines 27 (the pixel lines), and the touch lines 31 (the conductive lines). The common electrode 25 overlaps the pixel electrodes 24 via the inter-electrode insulator 41 (the insulator). The TFTs 23 are connected to the pixel electrodes 24. The source lines 27 are connected to the TFTs 23 and disposed adjacent to the pixel electrodes 24. The touch lines 31 are disposed adjacent to the pixel electrodes 24 on the side on which the source lines 27 are disposed with the gaps therebetween. The touch lines 31 are electrically connected to the common electrode 25. The touch lines 31 include the common portions 43 having the same positional relation to the source lines 27.

According to the configuration, the signals for driving the TFTs 23 or the signals for charging the pixel electrodes are transmitted through the source lines 27 and thus the pixel electrodes 24 are charged according to the driving of the TFTs 23. The common electrode 25 overlaps the pixel electrodes 24 via the inter-electrode insulator 41. The common voltage is applied to the common electrode 25 via the touch lines 31 connected to the common electrode 25. Potential differences are created between the charged pixel electrodes 24 and the common electrode 25. The image display is performed based on the potential differences. The touch lines 31 are arranged at intervals and thus short circuits are less likely to occur between the touch lines 31. Multiple touch lines 31 are provided for each pixel electrode 24. The number of the touch lines sufficient for the size of the common electrode 25 is provided. According to the configuration, distribution of voltage in a plane of the common electrode 25 is less likely to be uneven and thus a reduction in display quality can be reduced. The touch lines 31 are adjacent to the pixel electrodes 24 on the side on which the source lines 27 are disposed. The touch lines 31 and the source lines 27 are efficiently arranged and thus the reduction in aperture rate, which may result from the larger number of the touch lines 31, can be reduced. However, the parasitic capacitances may appear between the touch lines 31 and the source lines 27. If the parasitic capacitances appear between the touch lines 31, the display quality may decrease. The touch lines 31 include the common portions 43 having the same positional relations to the source lines 27. Therefore, parasitic capacitances that may appear between the common portions 43 of the touch lines 31 and the source lines 27 may be equal to each other. Because the parasitic capacitances between the touch lines 31 and the source lines 27 are less likely to be different from each other, the decrease in display quality, which may result from the difference in parasitic capacitance, can be reduced.

The common portions 43 include the line overlapping common portions 44 disposed to overlap the source lines 27 via the first interlayer insulator 36 and the planarization film 37 (the insulators). Because the common portions 43 include the line overlapping common portions 44 disposed to overlap the source lines 27 via the first interlayer insulator 36 and the planarization film 37, the touch lines 31 and the source lines 27 can be efficiently arranged. Therefore, the reduction in aperture rate, which may result from the larger number of the touch lines 31, can be reduced.

The common portions 43 include the line non-overlapping common portions 45 disposed not to overlap the source lines 27. Because the touch lines 31 include the line overlapping common portions 44 disposed to overlap the source lines 27 and the line non-overlapping common portions 45 disposed not to overlap the source lines 27, the touch lines 31 have larger areas having the common positional relation to the source lines 27 in comparison to a configuration in which the touch lines 31 include only the line overlapping common portions. According to the configuration, the differences in parasitic capacitance are further less likely to be created between the touch lines 31. This configuration is preferable for reducing the reduction in display quality.

Two touch lines 31 are disposed adjacent to the pixel electrode 24 on the side on which the source line 27 is disposed. Each of two touch lines 31 includes the line overlapping common portions 44. The line overlapping common portions 44 of the first touch line 31 and the line overlapping common portions 44 of the second touch line 31 are alternately and repeatedly arranged to overlap the source line 27. If the line overlapping common portions 44 of the first touch line 31 are directly adjacent to the pixel electrodes 24, the line overlapping common portions 44 of the second touch line 31 may be adjacent to the pixel electrodes 24 with the first touch line 31 between the second touch line 31 and the pixel electrodes 24. If the aperture rate of the pixel electrodes 24 is increased to the maximum in such a configuration, the areas of the pixel electrodes 24 may become asymmetric. This may create a difference between the amount of the transmitting light through pixel electrodes 24 adjacent to the line overlapping common portions 44 of the first touch lines 31 and the amount of the transmitting light through pixel electrode 24 adjacent to the line overlapping common portions 44 of the second touch lines 31. As described earlier, the line overlapping common portions 44 of the first touch line 31 and the line overlapping common portion 44 of the second touch line 31 are alternately and repeatedly arranged along the source line 27. Therefore, the difference in amount of transmitting light through the pixel electrodes 24 is less likely to be recognized. According to the configuration, the display quality can be maintained at the high level.

Each pixel electrodes 24 has the elongated shape. The source lines 27 and the touch lines 31 extend in the pixel electrode widthwise direction. If one of the touch lines 31 includes the line overlapping common portions 44, another touch line 31 may include portions that do not overlap the source line 27. This may cause irregularity in positional relation between the source lines 27 and the pixel electrodes 24. According to the configuration in which the source lines 27 and the touch lines 31 extend in the pixel electrode widthwise direction having the elongated shape, the parasitic capacitance that may appear between the source lines 27 and the pixel electrodes 24 may be small. Therefore, even if the positional relation between the source lines 27 and the pixel electrodes 24 is not constant, variations in voltage among the pixel electrodes 24 may be small. According to the configuration, a display defect such as shadowing is less likely to occur.

The common electrode 25 includes the touch electrodes 30 separated by the partition voids 25B and connected to the touch lines 31. Each touch electrode 30 is configured to form a capacitor with the position input member with which the position input is performed to detect a position of input by the position input member. The touch lines 31 are electrically connected to the touch electrodes 30 separated by the partition voids 25B to constitute the common electrode 25. Each touch electrode 30 and the position input member with which the position input operation is performed form a capacitor. A position of input by the position input member is detectable using a signal supplied through the touch line 31. The sufficient number of the touch lines 31 is provided. Therefore, the number of the touch electrodes 30 can be increased. This configuration is preferable for increasing the accuracy in position detection.

The liquid crystal display device 10 includes the gate lines 26 (the second pixel lines) and the shielding portions 48. The gate lines 26 cross the source lines 27 and extend to overlap the partition voids 25B. The gate lines 26 are electrically connected to the TFTs 23. The shielding portions 48 are disposed to overlap the gate lines 26 via the gate insulator 33, the first interlayer insulator 36, and the planarization film 37 (the insulators). The shielding portions 48 are electrically connected to the touch lines 31. The signals to drive the TFTs 23 and the signals to charge the pixel electrode 24 are transmitted through the source lines 27 and the gate lines 26. The pixel electrodes 24 are charged according to the driving of the TFTs 23. The gate lines 26 are disposed to overlap the partition voids 25B. Therefore, if the electric fields are created between the gate lines 26 and the edges of the touch electrodes 30 on the partition void 25B side, the display quality may decrease due to the electric fields around the edges of the touch electrodes 30 on the partition void 25B side. Because the shielding portions 48 are disposed to overlap the gate lines 26 via the gate insulator 33, the first interlayer insulator 36, and the planarization film 37 and electrically connected to the touch lines 31, the electric fields between the gate lines 26 and the edges of the touch electrodes 30 on the partition void 25B side are blocked. According to the configuration, the reduction in display quality due to the electric fields around the edges of the touch electrodes 30 on the partition void 25B side can be reduced. Furthermore, because the shielding portions 48 are disposed to overlap the gate lines 26, the reduction in aperture rate due to the shielding portions 48 can be reduced.

The touch electrodes 30 include the touch line overlapping holes 30A (the line overlapping holes) located to overlap at least the common portions 43 of the touch lines 31. A parasitic capacitance may appear between one of the touch electrodes 30 and the touch line 31 connected to another one of the touch electrodes 30. This may result in reduction in sensitivity in the position detection. With the touch line overlapping holes 30A in the touch electrodes 30, the parasitic capacitance between one of the touch electrodes 30 and the touch line 31 connected to another one of the touch electrodes 30 can be reduced. The reduction in sensitivity in the position detection can be reduced. Furthermore, the touch line overlapping holes 30A are located to overlap at least the common portions 43 of the touch lines 31. The parasitic capacitances are equalized among the touch electrodes 30 connected to some of the touch lines 31 but not to the rest of the touch lines 31. According to the configuration, the reduction in sensitivity in the position detection can be further properly reduced.

Second Embodiment

A second embodiment of the technology described herein will be described with reference to FIG. 11. The second embodiment includes an array substrate 121 including films configured different from those in the first embodiment. Components, functions, and effects similar to those of the first embodiment previously described will not be described.

Figure 11:
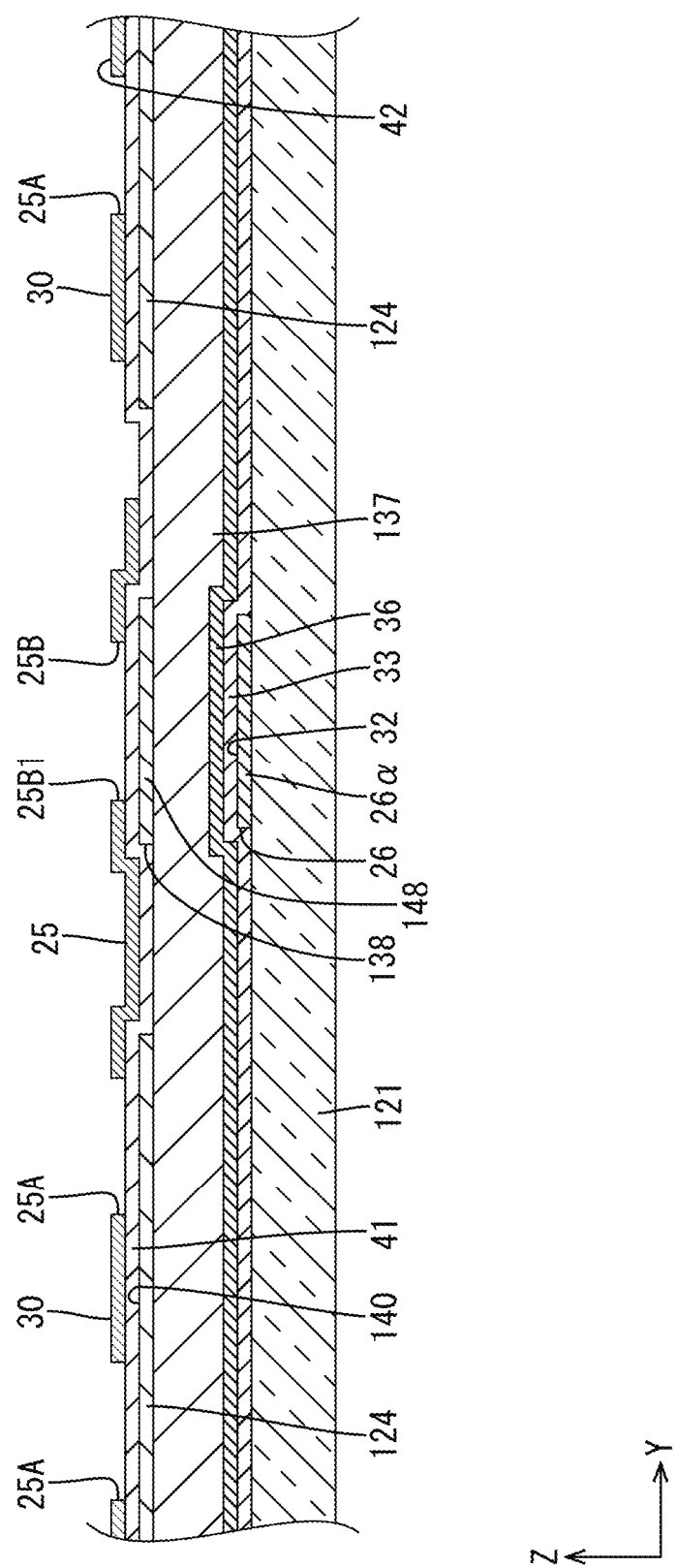
FIG. 11 is a cross-sectional view of a section of an array substrate included in a liquid crystal panel according to a second embodiment including a shielding portion.

As illustrated in FIG. 11, the array substrate 121 in this embodiment does not include the second interlayer insulator 39 (see at least FIG. 10), which is included in the first embodiment. A first transparent electrode film 140 including sections that are configured as pixel electrodes 124 is disposed in a layer in which a third metal film 138 is disposed above a planarization film 137. Conductive components (touch lines and shielding portions 148) prepared from the third metal film 138 are disposed not to overlap conductive components (pixel electrodes 124) prepared from the first transparent electrode film 140 in a plan view. Although the second interlayer insulator 39 is not provided, short circuits are less likely to occur between the conductive components prepared from the third metal film 138 and the conductive components prepared from the first transparent electrode film 140. Without the second interlayer insulator 39, a production cost of the array substrate 121 can be reduced.

Third Embodiment

A third embodiment of the technology described herein will be described with reference to FIG. 12. The third embodiment includes touch lines 231 configured different from the first embodiment. Components, functions, and effects similar to those of the first embodiment previously described will not be described.

Figure 12:
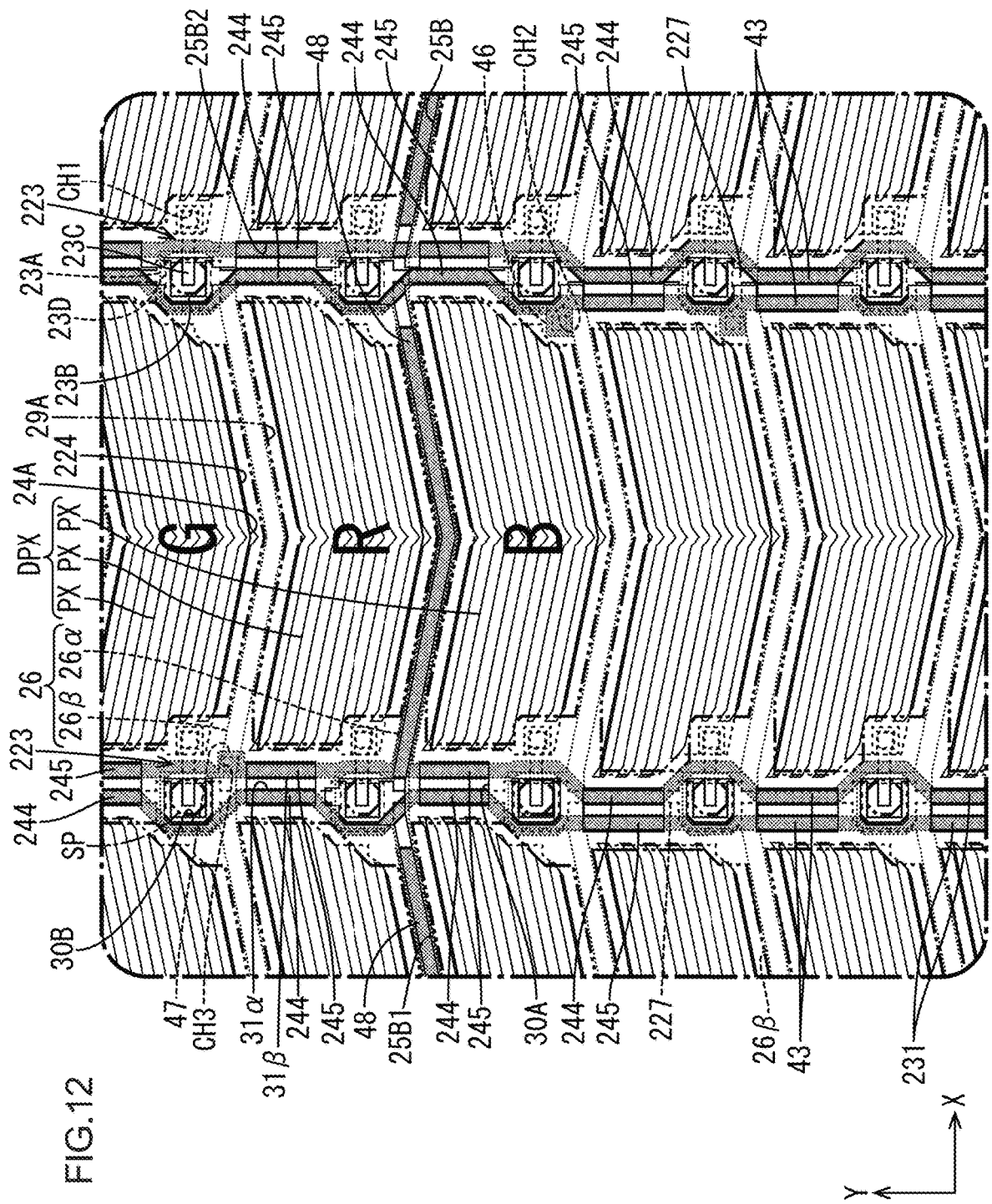
FIG. 12 is a plan view of an array substrate included in a liquid crystal panel according to a third embodiment illustrating a third metal film pattern.

As illustrated in FIG. 12, the touch lines 231 in this embodiment include line overlapping common portions 244 and line non-overlapping common portions 245. Every three (multiple) line overlapping common portions 244 are consecutively arranged without the line non-overlapping common portions 245 therebetween. Every three line non-overlapping common portions 245 are consecutively arranged without the line overlapping common portions 244 therebetween. The non-common structures described in the first embodiment section are disposed between every two consecutively-arranged line overlapping common portions 244, every two consecutively-arranged line non-overlapping common portions 245, and every consecutively-arranged line overlapping common portion 244 and the line non-overlapping common portion 245, respectively. Groups each including three consecutively-arranged line overlapping common portions 244 and groups each including three consecutively-arranged line non-overlapping common portions 245 in the touch lines 231 are alternately and repeatedly arranged. Three consecutively-arranged line non-overlapping common portions 245 in the touch line 231 are linearly routed parallel to the Y-axis direction. In comparison to the touch line 31 in the first embodiment (see FIG. 7), the routing of the consecutively-arranged line non-overlapping common portions 245 is simpler. The routing is preferable for the touch lines 231 having a smaller width or smaller intervals. If the pixel size is smaller, intervals between TFTs 223 that are adjacent to each other in the Y-axis direction are smaller. It may be difficult to route the touch lines 231 in zigzags without overlapping channels 223D. Therefore, the configuration of this embodiment is preferable. If the routing of the touch lines 231 is simple, a total length of the touch lines 231 may be smaller. This is preferable for reducing line resistances of the touch lines 231.

As illustrated in FIG. 12, colors to be displayed at three pixels PX that constitute the display pixel DPX are indicated by alphabets R, G and B. As illustrated in FIG. 12, the touch lines 231 are disposed such that three consecutively-arranged line overlapping common portions 244 are adjacent to three pixel electrodes 224 of three pixels PX that constitute the display pixel DPX, respectively. The touch lines 231 are disposed such that three consecutively-arranged line non-overlapping common portions 245 are adjacent to three pixel electrodes 224 of three pixels PX that constitute the display pixel PDX, respectively. According to the configuration, three consecutively-arranged line overlapping common portions 244 of the touch line 231 have the same positional relation to the respective pixel electrodes 224 of three pixels PX that constitute display pixel DPX. Furthermore, three consecutively-arranged line non-overlapping common portions 245 of the touch line 231 have the same positional relation to the respective pixel electrodes 224 of three pixels PX that constitute display pixel DPX. Three pixel electrodes 224 of three pixels PX that constitute display pixel DPX have the same positional relation to each source line 227 over which three line overlapping common portions 244 are disposed. Three pixel electrodes 224 of three pixels PX that constitute display pixel DPX have the same positional relation to the source line 227 over which three line non-overlapping common portions 245 are disposed. Parasitic capacitances between the source lines 227 and three pixel electrodes 224 of three pixels PX that constitute the display pixel DPX are about equal to each other. Therefore, unevenness in color of the display pixel DPX (e.g., linear unevenness in color in the X-axis direction), which may result from the parasitic capacitances, can be reduced.

In this embodiment, the touch lines 231 are disposed such that two touch lines 231 are provided for each line of the pixel electrodes 224 on the side on which the corresponding source line is disposed. The touch lines 231 include multiple line overlapping common portions 244. The line overlapping common portions 244 of one of the touch lines 231 are consecutively arranged to overlap the source line 227. The line overlapping common portions 244 of the other touch line 231 are consecutively arranged to overlap the source line 227. According to the configuration, the routing of the touch lines 231 is less likely to become complex. This configuration is preferable for the touch lines 231 having a smaller width or smaller intervals. Because the routing of the touch lines 231 is less likely to become complex, the total length of the touch lines 231 may be smaller. This configuration is preferable for reducing the resistances of the touch lines 231.

Color filters (see reference sign 28 in FIG. 3) are disposed to overlap the pixel electrodes 224. Different colors of the color filters are arranged in a direction in which the touch lines 231 extend. The pixel electrodes 224 are arranged at least in the direction in which the touch lines 231 extend. The pixel electrodes 224 and the color filters that overlap the pixel electrodes 224 constitute the pixels PX. The pixels arranged in the direction in which the touch lines 231 extend constitute one display pixel DPX. The line overlapping common portions 244 of the touch lines 231 are consecutively arranged to be adjacent to the respective pixel electrodes 224 of the pixels PX that constitute the display pixel DPX. According to the configuration, the line overlapping common portions 244 of one of two touch lines 231 have the same positional relation to the respective pixel electrodes 224 of the pixels PX that constitute the display pixel DPX. The pixel electrodes 224 of the pixels PX that constitute the display pixel DPX have the same positional relation to the source line 227 over which the line overlapping common portions 244 are disposed. The parasitic capacitances between the source line 227 and the pixel electrodes 224 of the pixels PX that constitute display pixel DPX are about equal to each other. Therefore, the unevenness in color of the display pixel DPX (e.g., linear unevenness in color in the X-axis direction), which may result from the parasitic capacitances, can be reduced.

Fourth Embodiment

A fourth embodiment of the technology described herein will be described with reference to FIGS. 13 to 15. The fourth embodiment includes touch lines 331 in addition to the configuration of the first embodiment. Components, functions, and effects similar to those of the first embodiment previously described will not be described.

Figure 13:
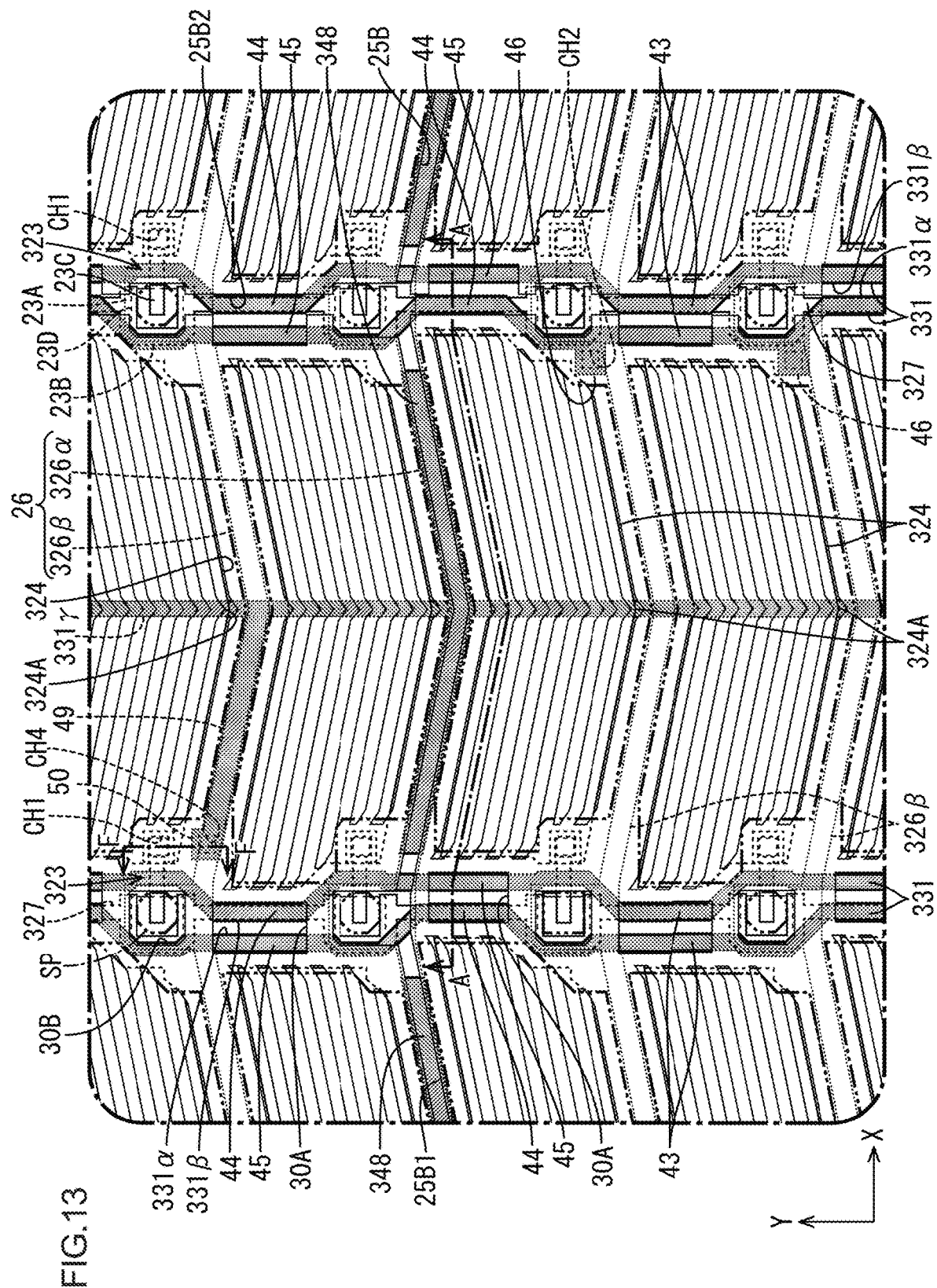
FIG. 13 is a plan view of an array substrate included in a liquid crystal panel according to a fourth embodiment illustrating a third metal film pattern.
Figure 14:
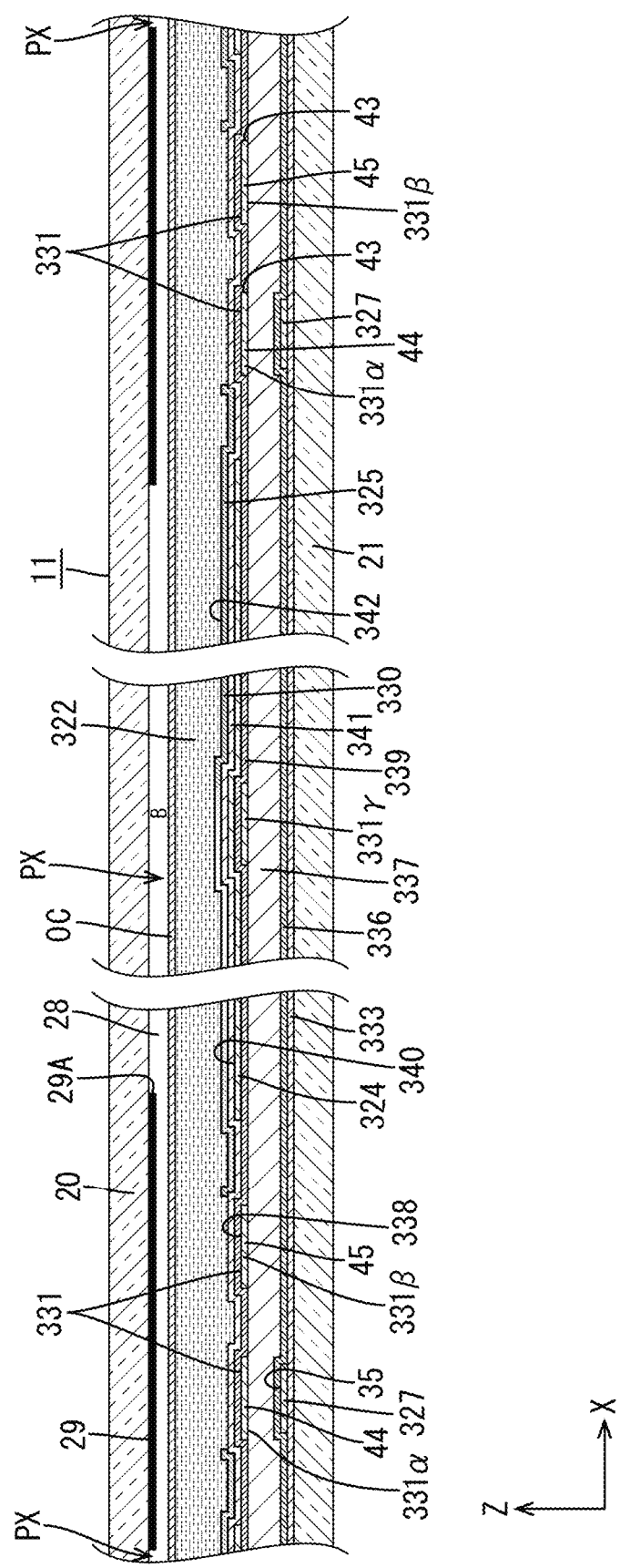
FIG. 14 is a cross-sectional view of a liquid crystal panel along line A-A in FIG. 13.

As illustrated in FIGS. 13 and 14, the touch lines 331 in this embodiment include first touch lines 331α, second touch lines 331β, and third touch lines 331γ (second conductive lines). The third touch lines 331γ are disposed to cross pixel electrodes 324. The third touch lines 331γ are prepared from a third metal film 338 from which the first touch lines 331α and the second touch lines 331β are prepared. Specifically, the third touch lines 331γ linearly extend in the Y-axis direction to cross the pixel electrodes 324 that are arranged in the Y-axis direction. The third touch lines 331γ are disposed to overlap bending portions 324A of the pixel electrodes 324 in a plan view. The third touch lines 331γ prepared from the third metal film 338 are insulated from the bending portions 324A of the pixel electrodes 324 prepared from a first transparent electrode film 340 with a second interlayer insulator 339 disposed between the third metal film 338 and the first transparent electrode film 340. The third touch lines 331γ are prepared from the third metal film 338 and thus do not pass light. If the third touch lines 331γ are disposed to overlap the pixel electrodes 324, an amount of light transmitting through the pixel electrodes 324 may decrease. This may result in a reduction in brightness. In this embodiment, the third touch lines 331γ are disposed to overlap the bending portions 324A of the pixel electrodes 324 corresponding to the orientation borders described in the first embodiment section. Therefore, even if the light is blocked by the third touch lines 331γ, contribution of the light to the image display is low and thus the reduction in brightness due to the third touch lines 331γ is reduced. The third touch lines 331γ each having such a configuration are disposed to overlap all the pixel electrodes arranged in the X-axis direction, respectively. The number of the third touch lines 331γ is equal to the number of the pixel electrodes 324 arranged in the X-axis direction. Specifically, the number of the third touch lines 331γ is 1,920, which is equal to the number of source lines 327. The number of the touch lines 331 (the first touch lines 331α, the second touch lines 331β, and the third touch lines 331γ) is 5,760, which is triple the number of the source lines 327 and larger than double the number of the touch electrodes 330, that is, 2,691. According to the configuration, two or more touch lines 331 can be connected to each touch electrode 330. The number of the touch electrodes 330 can be set equal to the number of the touch lines 331. Therefore, the size (a dimension of each edge) of the touch electrodes 330 can be further reduced. This can further increase the definition in the sensing (position detection).

As illustrated in FIG. 13, shielding portions 348 are electrically connected to the third touch lines 331γ in this embodiment. The shielding portions 348 extend from the third touch lines 331γ to the right and the left in FIG. 13 along void overlapping gate lines 326α. The shielding portions 348 and touch electrode connecting portions 49 (position detecting electrode connecting portions) are connected to the third touch lines 331γ. The touch electrode connecting portions 49 are disposed to overlap void non-overlapping gate lines 326β that are disposed such that the pixel electrodes 324 are sandwiched between the void overlapping gate lines 326α and the void non-overlapping gate lines 326β with respect to the Y-axis direction. Each touch electrode connecting portion 49 has a strip shape with a constant width to extend parallel to the void non-overlapping gate lines 326β (in the pixel electrode lengthwise direction). The touch electrode connecting portions 49 are disposed such that the pixel electrodes 324 are sandwiched between the touch electrode connecting portions 49 and the shielding portions 348 with respect to the Y-axis direction. The width of the touch electrode connecting portions 49 is slightly larger than the width of the void non-overlapping gate lines 326β but smaller than the interval between the pixel electrodes 324 that are adjacent to each other in the Y-axis direction. Therefore, the touch electrode connecting portions 49 do not overlap the pixel electrodes 324. The touch electrode connecting portions 49 are prepared from the third metal film 338 from which the third touch lines 331γ and the shielding portions 348 are prepared and directly coupled to the third touch lines 331γ. The touch electrode connecting portions 49 extend from the third touch lines 331γ to which the touch electrode connecting portions 49 are connected toward one side (the left in FIG. 13) along the void non-overlapping gate lines 326β. Distal ends of the touch electrode connecting portions 49 are disposed adjacent to the TFTs 23 connected to the pixel electrodes 324 over which the third touch lines 331γ are disposed. As illustrated in FIG. 15, the touch electrode connecting portions 49 prepared from the third metal film 338 are insulated from the void non-overlapping gate lines 326β prepared from a first metal film 332 with a gate insulator 333, a first interlayer insulator 336, and a planarization film 337 disposed between the third metal film 338 and the first metal film 332. A relation between the touch electrode connecting portions 49 and the void non-overlapping gate lines 326β is similar to a relation between the shielding portions 348 and the void overlapping gate lines 326α illustrated in FIG. 14.

Figure 15:
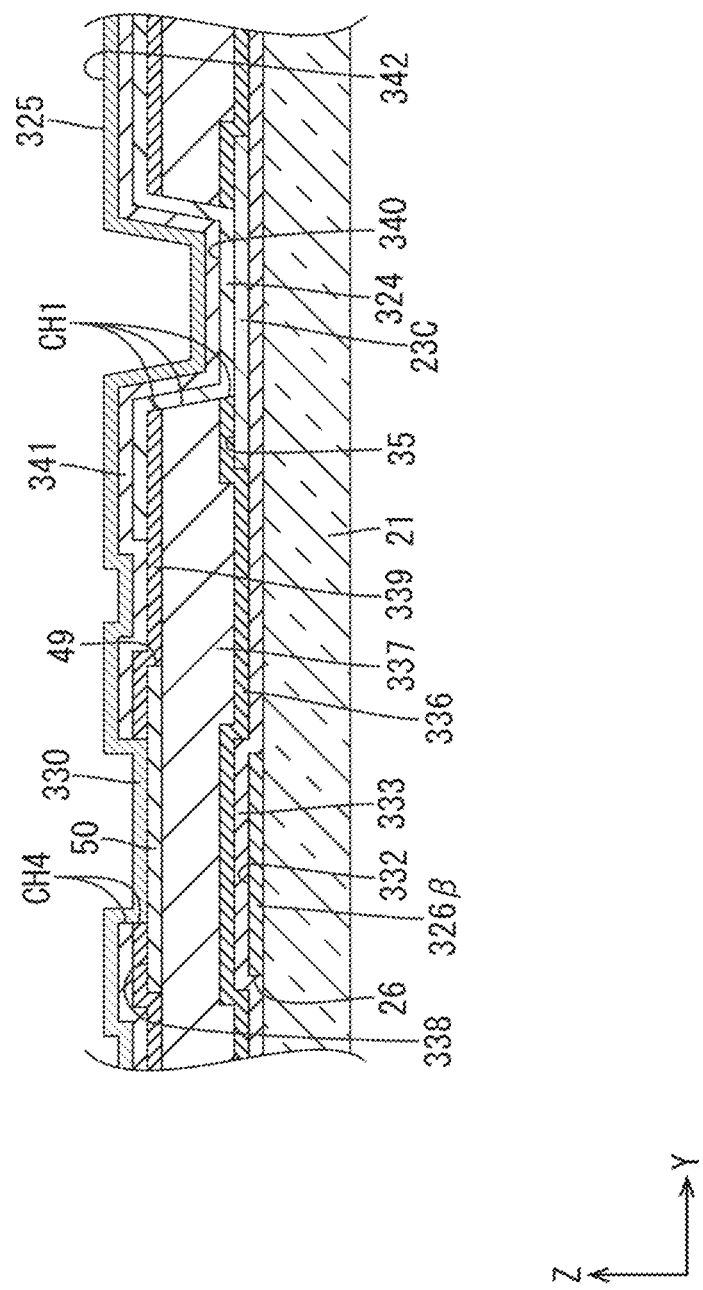
FIG. 15 is a cross-sectional view of an array substrate along line F-F in FIG. 13.

As illustrated in FIG. 15, the distal ends of the touch electrode connecting portions 49 that extend from the third touch lines 331γ are connected to the touch electrodes 330 (a common electrode 325). The distal ends of the touch electrode connecting portions 49 are disposed adjacent to TFTs 323 connected to the pixel electrodes 324 over which the third touch lines 331γ are disposed. Therefore, sufficient spaces can be provided for connecting structures (third connecting portions 50 and third contact holes CH4, which will be described next) for connection with the touch electrodes 330. In comparison to a configuration in which the connecting structures for connection with the touch electrodes 330 are provided in the middle of the touch electrode connecting portions, a reduction in brightness due to the connecting structures for connection with the touch electrodes 330 is further properly reduced. The distal ends of the touch electrode connecting portions 49 connected to the touch electrodes 330 are configured as the third connecting portions 50 connected to the touch electrodes 330. The third connecting portions 50 of the touch electrode connecting portions 49 prepared from the third metal film 338 are connected to the touch electrodes 330 prepared from the second transparent electrode film 342 via the third contact holes CH4 in the second interlayer insulator 339 and an inter-electrode insulator 341 disposed between the third metal film 338 and the second transparent electrode film 342. The third connecting portions 50 are linearly arranged along the TFTs 323 and the Y-axis direction.

In this embodiment, as described above, the pixel electrodes 324 have the elongated shape and include the bending portions 324A in the middle in the lengthwise direction. This embodiment includes a liquid crystal layer 322 and the third touch lines 331γ (the second conductive lines). The third touch lines 331γ extend in the pixel electrode widthwise direction and overlap the bending portions 324A of the pixel electrodes 324 via the second interlayer insulator 339 (the insulator). The third touch lines 331γ are electrically connected to the common electrode 325. According to the configuration, the common voltage is stably applied to the common electrode 325 via the touch lines 331 and the third touch lines 331γ connected to the common electrode 325. When the pixel electrodes 324 are charged, the potential differences are created between the pixel electrodes 324 and the common electrode 325. With the electric fields created according to the potential differences, the orientation of the liquid crystal molecules in the liquid crystal layer 322 is controlled. The image display is performed based on the orientation of the liquid crystal molecules. The pixel electrodes 324 have the elongated shape and include the bending portions 324A in the middle in the lengthwise direction. Borders (hereinafter referred to as orientation borders) between regions in which orientations of the liquid crystal molecules based on the fringe electric fields that affect the liquid crystal layer 322 are different exist around the bending portions 324A of the pixel electrodes 324. The control of the orientation of the liquid crystal molecules is difficult around the orientation borders. This may result in a lower level of contribution to the image display. The third touch lines 331γ electrically connected to the common electrode 325 extend in the pixel electrode widthwise direction and overlap the bending portions 324A of the pixel electrodes 324 via the second interlayer insulator 339. Even if light is blocked by the third touch lines 331γ, the light is less likely to contribute to the image display and thus the reduction in brightness due to the third touch lines 331γ can be reduced.

Fifth Embodiment

A fifth embodiment of the technology described herein will be described with reference to FIGS. 16 to 18. The fifth embodiment includes touch lines 431 in addition to the configuration of the first embodiment. Components, functions, and effects similar to those of the first embodiment previously described will not be described.

Figure 16:
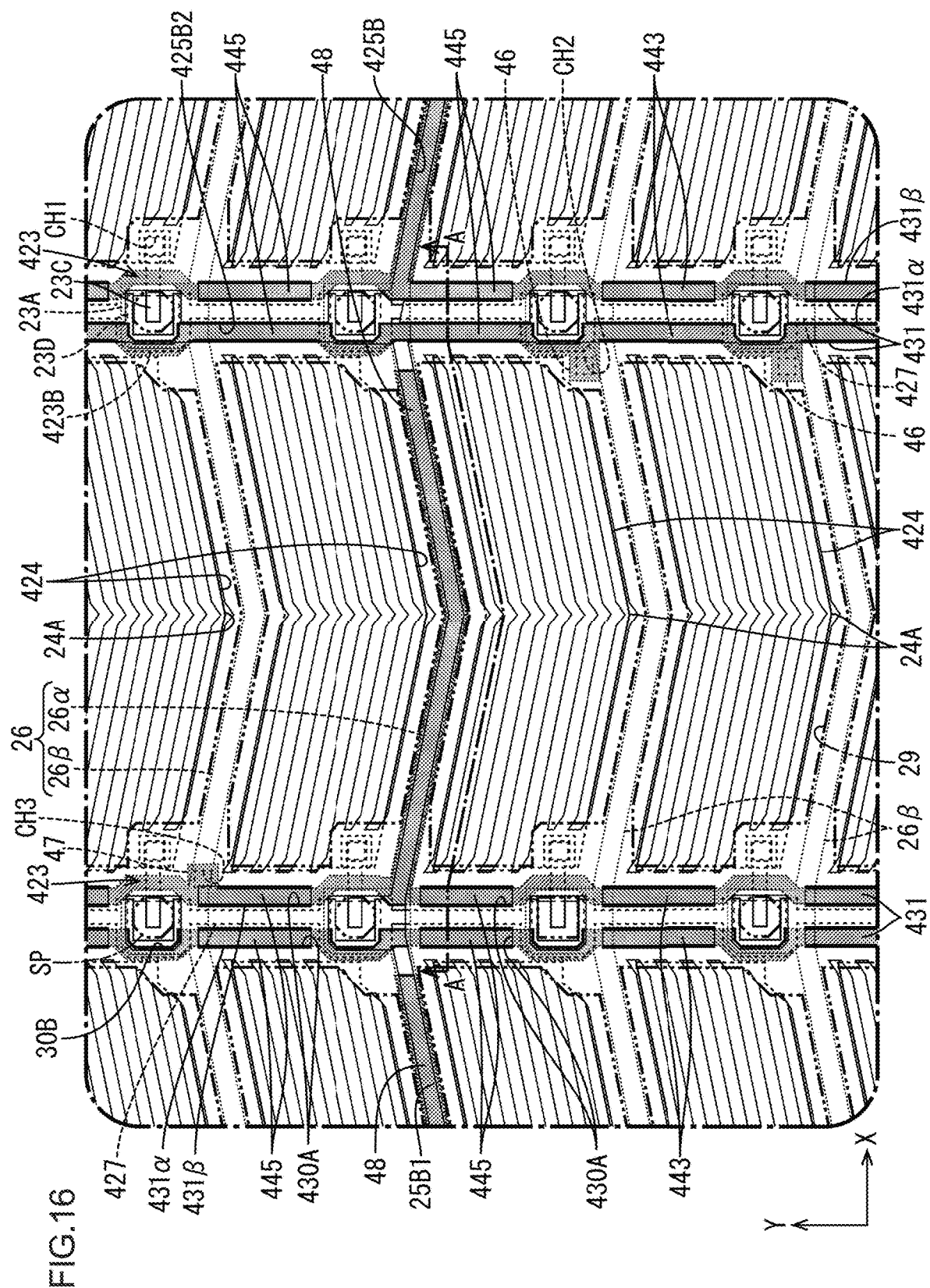
FIG. 16 is a plan view of an array substrate included in a liquid crystal panel according to a fifth embodiment illustrating a third metal film pattern.
Figure 17:
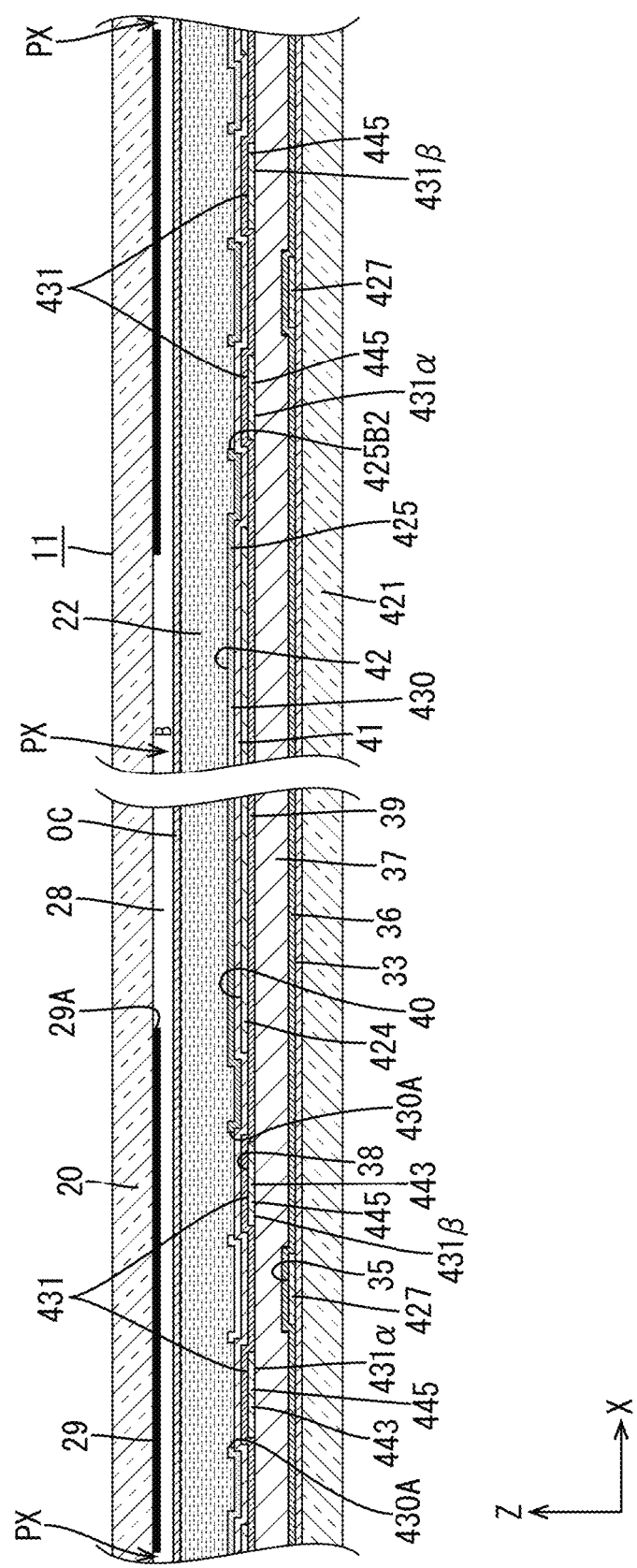
FIG. 17 is a cross-sectional view of a liquid crystal panel along line A-A in FIG. 16.

As illustrated in FIGS. 16 and 17, the touch lines 431 in this embodiment include common portions 443 that include line non-overlapping common portions 445 but not the line overlapping common portions 44 in the first embodiment (see FIG. 7). Specifically, the touch lines 431 do not cross TFTs 423, that is, the touch lines 431 include the line non-overlapping common portions 445 that are adjacent to pixel electrodes 424. Each line non-overlapping common portion 445 is disposed adjacent to source lines 427 with a small gap, for example, about 1.5 µm in the X-axis direction. The line non-overlapping common portions 445 of two touch lines 431 adjacent to the pixel electrodes 424 are disposed to sandwich the corresponding source line 427 in the X-axis direction. The center of the source line 427 and the centers of the line non-overlapping common portions 445 are about 6 µm apart from each other in the X-axis direction. The width of each line non-overlapping common portion 445 is about 5 µm. The source line 427 and two line non-overlapping common portions 445 that sandwich the source line 427 have a common positional relation. It is preferable that the gaps between the source line 427 and the line non-overlapping common portions 445 are equal to each other. However, differences may be created between the gaps due to alignment errors that may occur in a production process (a photolithography process) of an array substrate 421. The differences may be so small that the gaps can be considered equal to each other. As described above, the common portions 443 include the line non-overlapping common portions 445. In comparison to the first embodiment in which the common portions 43 include the line overlapping common portions 44, parasitic capacitances that may appear between the line non-overlapping common portions 445 and the source lines 427 can be reduced. This reduces the reduction in display quality. First touch lines 431α of the touch lines 431 include sections crossing the TFTs 423 and being adjacent to the pixel electrodes 424 overlap sections of source electrodes 423B of the TFTs 423 similar to the first embodiment. However, the first touch lines 431α do not have common structures and the overlapping areas are small. Therefore, the parasitic capacitances are sufficiently reduced. Each source line 427 is sandwiched between two line non-overlapping common portions 445. The line non-overlapping common portions 445 of the touch lines 431 can be efficiently arranged while the distances between the source line 427 and two pixel electrodes 424 that sandwich the source line 427 are maintained equal. The parasitic capacitances that may appear between the source line 427 and the pixel electrodes 424 are equalized. A display defect such as shadowing is less likely to occur and a reduction in aperture rate can be reduced.

As illustrated in FIGS. 16 and 17, the line non-overlapping common portions 445 of the touch lines 431 and portions of the touch lines 431 crossing the TFTs 423 and being adjacent to the pixel electrodes 424 are alternately and repeatedly arranged. Each touch line 431 includes the number of the line non-overlapping common portions 445 equal to the number of the pixel electrodes 424 in the Y-axis direction. Because the touch lines 431 include the line non-overlapping common portions 445 of the common portions 443, the touch lines 431 can be linearly routed in the Y-axis direction. In comparison to the touch lines 31 in the first embodiment (see FIG. 7) or the touch lines 231 in the third embodiment (see FIG. 11), the routing of the touch lines 431 is more simplified. This configuration is more preferable for the touch lines 431 having a smaller width and a smaller interval.

Figure 18:
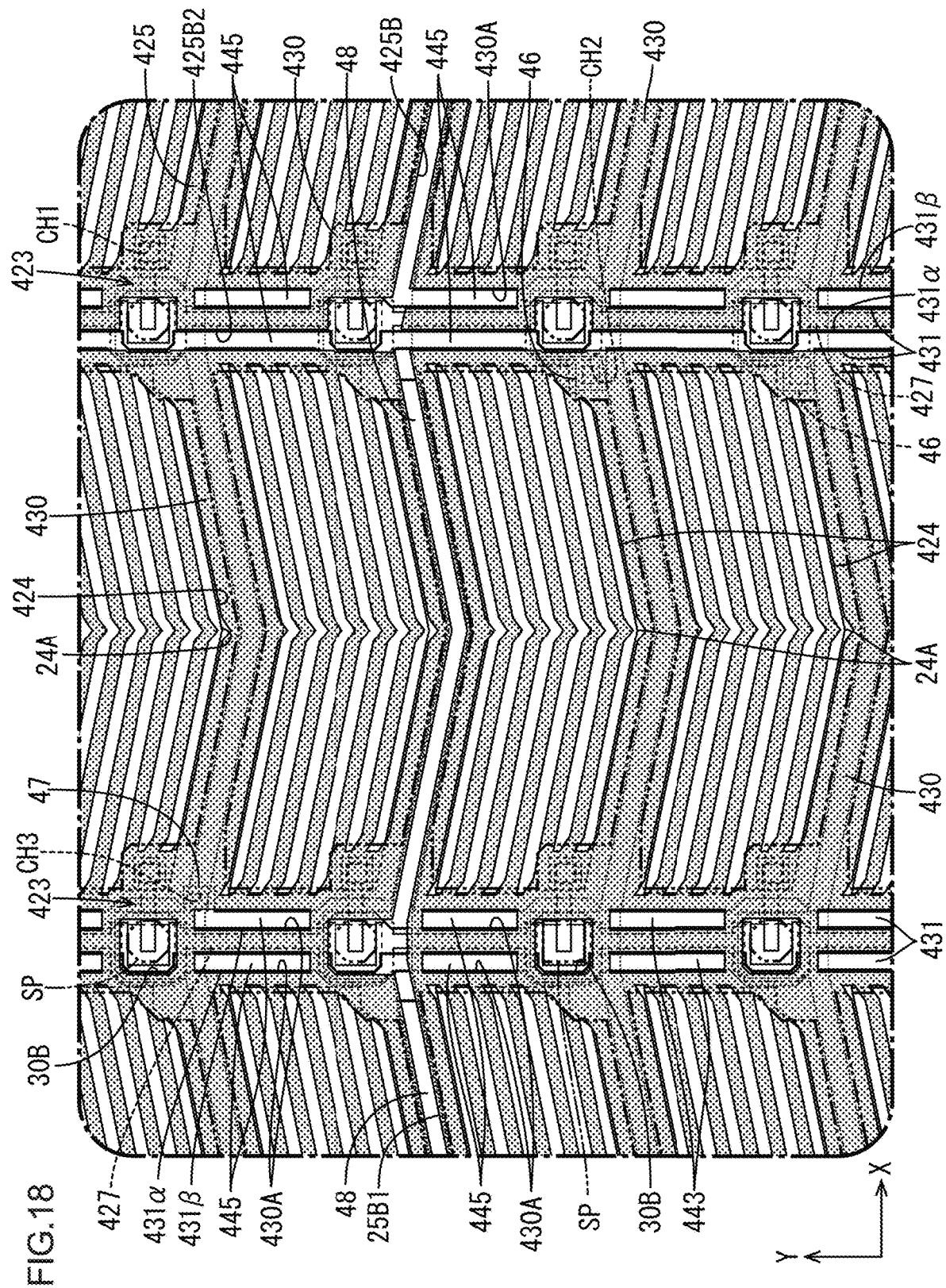
FIG. 18 is a plan view of the array substrate illustrating a second transparent electrode film pattern.

As illustrated in FIGS. 17 and 18, some of the touch lines 431 are disposed such that the line non-overlapping common portions 445 overlap partition voids 425B that divide a common electrode 425. Specifically, the line non-overlapping common portions 445 are disposed not to overlap the source lines 427 and thus sections of second voids 425B2 of the partition voids 425B overlapping the line non-overlapping common portions 445 do not overlap the source lines 427. The line non-overlapping common portions 445 that overlap the partition voids 425B are included in the first touch lines 431α of the touch lines 431 that are adjacent to the source lines 427. The second voids 425B2 extend substantially in the Y-axis direction. Each second void 425B2 overlaps all the line non-overlapping common portions 445 of the corresponding first touch line 431α. According to the configuration, an electric field that may be created between the source line 427 and an edge of a touch electrode 430 on the second void 425B2 side of the partition void 425B can be blocked by the line non-overlapping common portions 445 that overlap the second voids 425B2 of the partition voids 425B. The reduction in display quality due to the electric field around the edge of the touch electrode 430 on the second void 425B2 side of the partition void 425B can be reduced. Touch line overlapping voids 430A of the touch electrodes 430 include ones that overlap the line non-overlapping common portions 445 of the first touch lines 431α and one that overlap the line non-overlapping common portions 445 of the second touch lines 431β, which are independently provided and not coupled to each other.

In this embodiment, as described above, the common portions 443 include the line non-overlapping common portions 445 that do not overlap the source lines 427. In comparison to a configuration in which the common portions are disposed to overlap the source lines 427, the parasitic capacitances between the line non-overlapping common portions 445 and the source lines 427 are reduced. Therefore, the reduction in display quality is reduced.

The pixel electrodes 424 are disposed to sandwich the source lines 427. The touch lines 431 are disposed such that two touch lines 431 are sandwiched between the pixel electrodes 424 that sandwich the corresponding source line 427 and the line non-overlapping common portions 445 of the touch lines 431 sandwich the source line 427. In such a configuration, the line non-overlapping common portions 445 of each touch line 431 are disposed between the source line 427 and corresponding one of the pixel electrodes 424 that sandwich the source line 427. According to the configuration, the line non-overlapping common portions 445 of two touch lines 431 can be efficiently disposed while the distances between the source line 427 and two pixel electrodes 424 that sandwich the source line 427 are maintained equal. The parasitic capacitances between the source line 427 and the pixel electrodes 424 are equalized. A display defect such as shadowing is less likely to occur and a reduction in aperture rate can be reduced.

The common electrode 425 includes the touch electrodes 430 (the position detecting electrodes) separated from each other by the partition voids 425B. The touch electrodes 430 are connected to the touch lines 431. The touch electrodes 430 and the position input member with which the position input operation is performed form a capacitor to detect a position of input by the position input member. Some of the touch lines 431 are disposed such that at least the line non-overlapping common portions 445 overlap the partition voids 425B. The touch lines 431 are electrically connected to the touch electrodes 430 of the common electrode 425 separated by the partition voids 425B. The touch electrodes 430 and the position input member with which the position input is performed form capacitors to detect positions of input by the position input member using signals supplied to the touch lines 431. The line non-overlapping common portions 445 that overlap the partition voids 425B are disposed not to overlap the source lines 427. Therefore, the source lines 427 do not overlap the partition voids 425B. If an electric field is created between the source line and the edge of the touch electrode 430 on the partition void 425B side, the display quality may decrease due to the electric field around the edge of the touch electrode 430 on the partition void 425B side. In this embodiment, at least the line non-overlapping common portions 445 of some of the touch lines 431 are disposed to overlap the partition voids 425B. The electric fields that may be created between the source lines 427 and the edges of the touch electrodes 430 on the partition void 425B side can be blocked by the line non-overlapping common portions 445 that overlap the partition voids 425B. According to the configuration, the reduction in display quality due to the electric fields around the edges of the touch electrodes 430 on the partition void 425B side can be reduced.

Sixth Embodiment

A Sixth embodiment of the technology described herein will be described with reference to FIGS. 19 to 21. The sixth embodiment includes pixel electrodes 524 arranged differently from the fifth embodiment. Components, functions, and effects similar to those of the fifth embodiment previously described will not be described.

Figure 19:
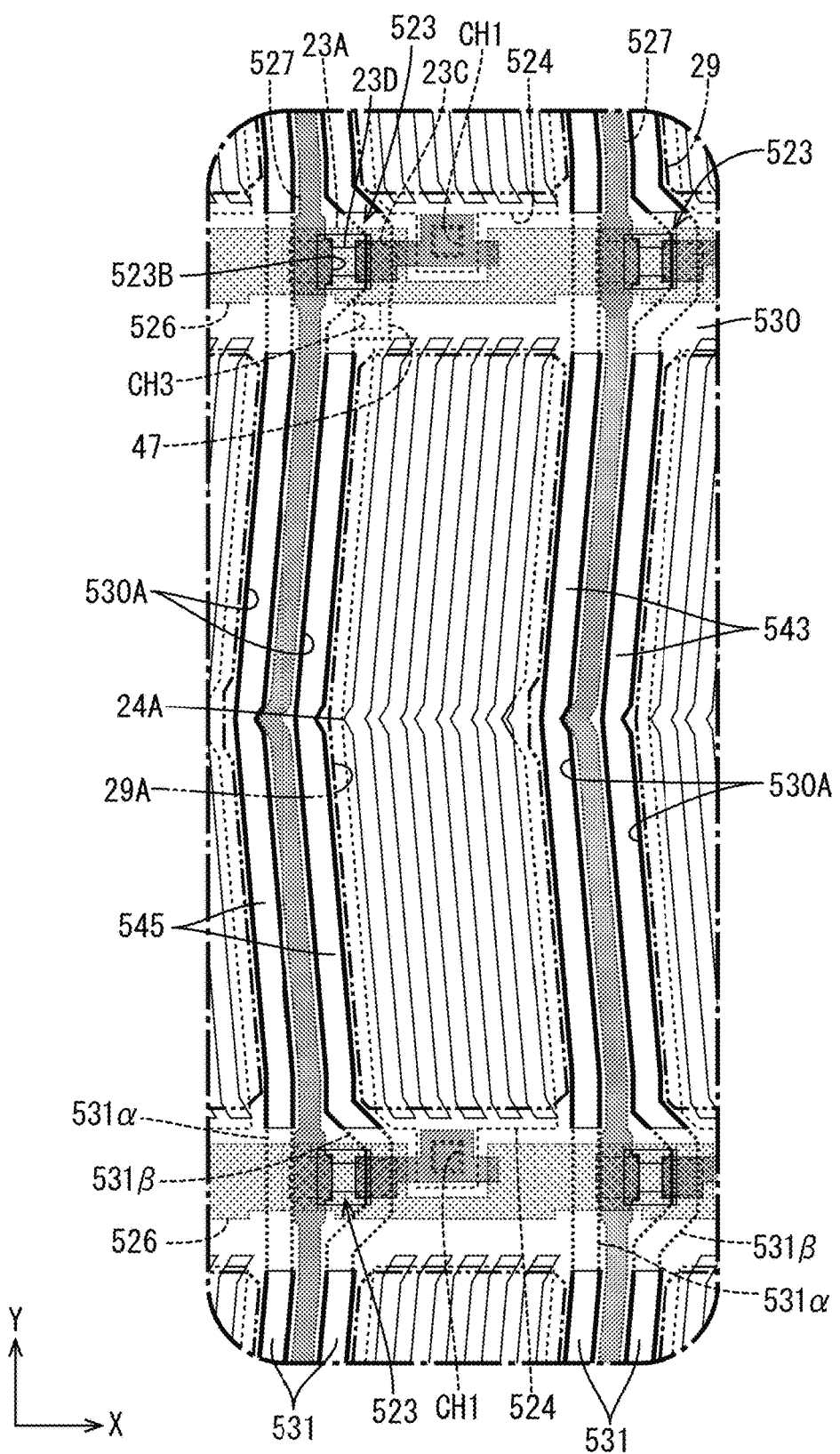
FIG. 19 is a plan view of an array substrate included in a liquid crystal panel according to a sixth embodiment illustrating a first metal film pattern and a second metal film pattern.

As illustrated in FIG. 19, each of the pixel electrodes 524 in this embodiment has an elongated shape. The pixel electrodes 524 are disposed with a lengthwise direction thereof corresponding with the Y-axis direction and a widthwise direction thereof corresponding with the X-axis direction. Gate lines 526 extend in the width direction of the pixel electrodes 524. Source lines 527 and touch lines 531 extend in the pixel electrode lengthwise direction. Long edges of the pixel electrodes 524 bend in a plan view. The source lines 527 are parallel to the long edges of the pixel electrodes 524. The source lines 527 repeatedly bend along the long edges of the pixel electrodes 524 to form zigzags. The source lines 527 are sharply bent around TFTs 523. The bent portions are configured as source electrodes 523B. The gate lines 526 include narrow portions to go around connecting structures of the TFTs 523 with the pixel electrodes 524. According to the configuration, electric fields may be created between the long edges of the pixel electrodes 524 and the source lines 527, which may result in parasitic capacitances. In comparison to the configuration of the first embodiment, the parasitic capacitances between the pixel electrodes 524 and the source lines 527 may be larger.

Figure 20:
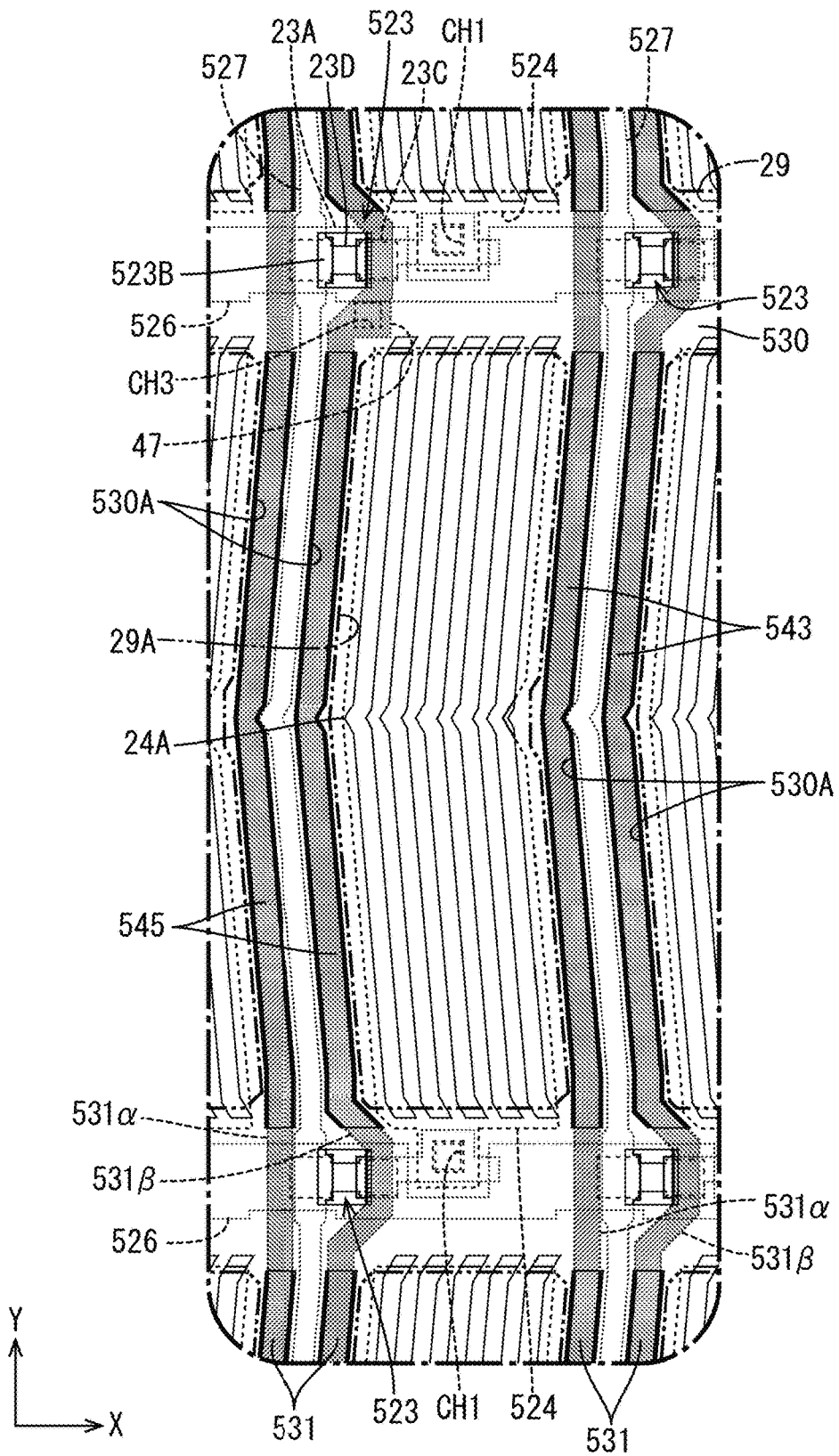
FIG. 20 is a plan view of the array substrate illustrating a third metal film pattern.
Figure 21:
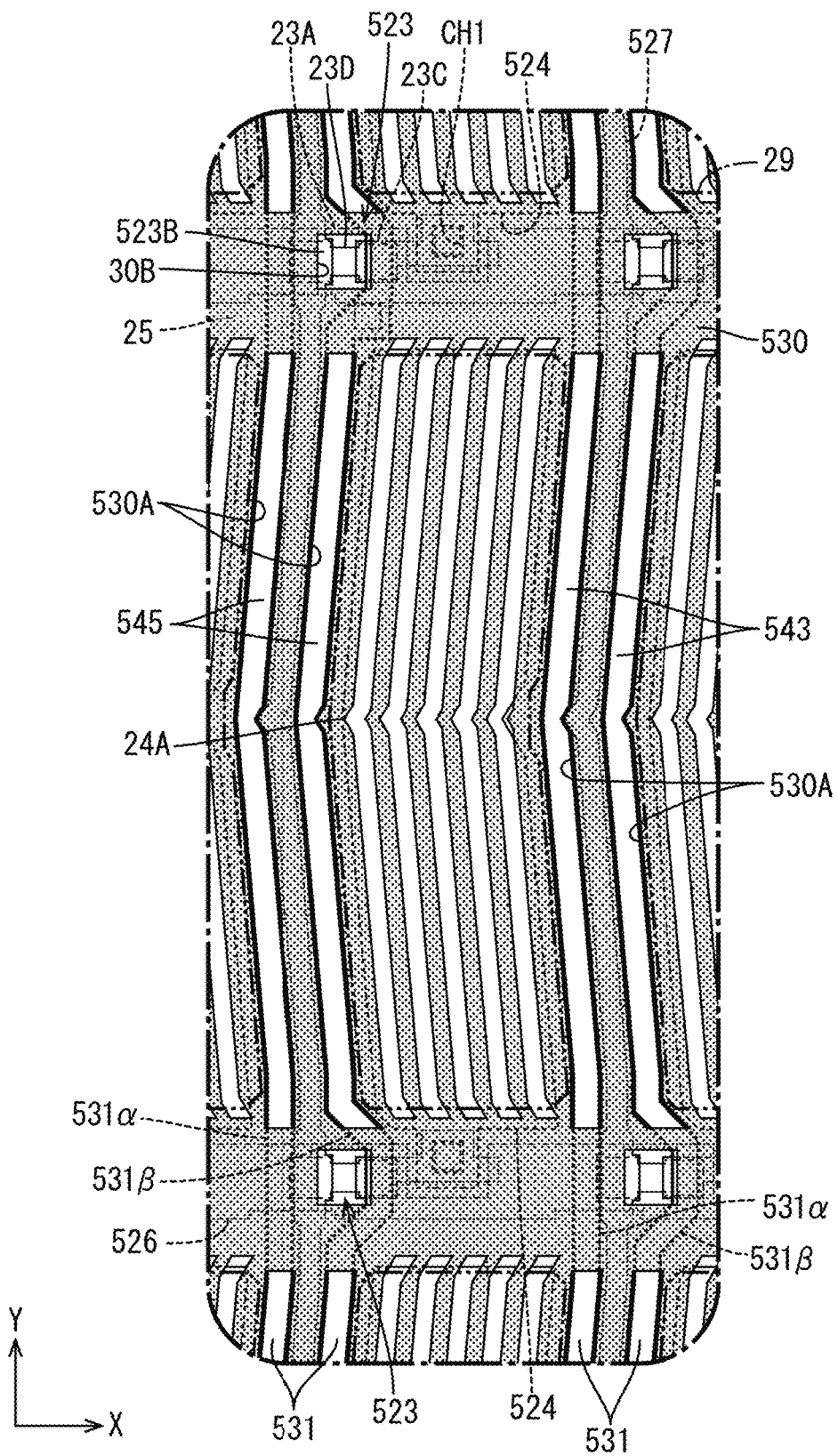
FIG. 21 is a plan view of the array substrate illustrating a second transparent electrode film pattern.

As illustrated in FIG. 20, common portions 543 of the touch lines 531 include only line non-overlapping common portions 545 and do not include the line overlapping common portions 44 (see FIG. 7) included in the first embodiment, similar to the fifth embodiment. The line non-overlapping common portions 545 are disposed between the long edges of the pixel electrodes 524 and the source lines 527 without exception. Positional relations of the pixel electrodes 524 relative to two touch lines 531 and the source line 527 are maintained constant. Parasitic capacitances between the source lines 527 and the pixel electrodes 524 are stable. Therefore, the display quality is stable. As illustrated in FIG. 21, touch line non-overlapping voids 530A in touch electrodes 530 include ones that overlap the line non-overlapping common portions 545 of first touch lines 531α and ones that overlap the line non-overlapping common portions 545 of second touch lines 531β that are independent from each other and not coupled to each other.

As describe above, in this embodiment, each pixel electrode 524 has the elongated shape and the source lines 527 and the touch lines 531 extend in the pixel electrode lengthwise direction. According to the configuration in which the source lines 527 and the touch lines 531 extend in the lengthwise direction of the pixel electrodes 524 having the elongated shape, parasitic capacitances between the source lines 527 and the pixel electrodes 524 tend to be larger. In this embodiment, the common portions 543 of the touch lines 531 include the line non-overlapping common portions 545. This configuration is preferable for maintaining the positional relations of the pixel electrodes 524 relative to the touch lines 531 and the source lines 527 adjacent to the pixel electrodes 524 constant. The parasitic capacitances between the source lines 527 and the pixel electrodes 524 are stable. Therefore, the display quality is stable.

Other Embodiments

The technology described herein is not limited to the embodiments described above and illustrated by the drawings. For example, the following embodiments will be included in the technical scope of the technology described herein.

(1) In each of the first to the fourth embodiments, the common portions of the touch lines include the line overlapping common portions and the line non-overlapping common portions. However, the common portions of the touch lines may include only the line overlapping common portions and not include the line non-overlapping common portions.

(2) In each of the above embodiments, two touch lines are disposed adjacent to the pixel electrodes on the side on which the source line is disposed. However, multiple touch lines may be disposed adjacent to the pixel electrodes on the side on which the gate line is disposed.

(3) In each of the above embodiments, the liquid crystal panel has the display function and the touch panel function and the common electrode includes the touch electrodes separated from each other by the partition voids. However, the liquid crystal panel may have the display function but not have the touch panel function and the common electrode may have a non-divided structure. The touch lines may be configured as common lines connected to the common electrode. In such a configuration in which the common lines include common portions having a common positional relation to the source lines, parasitic capacitance between the common portions and the source lines are equal to each other. This configuration can provide an effect of reducing a reduction in display quality due to differences in parasitic capacitance.

(4) The two-dimensional shape of the pixel electrodes may be altered from that in each of the above embodiments where appropriate. For example, the two-dimensional shape of the pixel electrodes may include multiple bending portions. According to such a configuration, multiple third touch lines may be disposed to overlap the bending portions of each pixel electrode. A larger number of the touch lines may be provided. The two-dimensional shape of each pixel electrode including one bending portion may be altered from the two-dimensional shape illustrated in the drawings. For example, the bending portion may be located at a position relative to the long edge of the pixel electrode other than the middle. The pixel electrodes may have a shape without the bending portion (e.g., a rectangular shape or a square shape).

(5) In each of the above embodiments, the ratio of the long dimension of each pixel electrode relative to the short dimension is 3. However, the ratio of the long dimension of each pixel electrode relative to the short dimension may be altered from 3. For example, if four colors of color filters (e.g., R, G, B, and white) are arranged in the Y-axis direction, the ratio of the long dimension of the pixel electrode to relative to the short dimension may be set to 4.

(6) In each of the above embodiments (except for the fourth embodiment), the shielding portions are connected to the second touch lines. However, the shielding portions may be connected to the first touch lines. Shielding portions connected to the first touch lines and shielding portions connected to the second touch lines may be provided. Alternatively, the shielding portions may be omitted.

(7) In each of the above embodiments (except for the fourth embodiment), the first touch lines and the second touch lines include the connecting structures (the first connecting portions and the second connecting portions) for the connection with the touch electrodes. However, the shielding portions may include connecting portions for connection with the touch electrodes.

(8) In the third embodiment, the line overlapping common portions and the line non-overlapping common portions of the touch lines are disposed such that every three of them are consecutively disposed. However, every two or ever four or more of the line overlapping common portions and the line non-overlapping common portions of the touch lines may be consecutively disposed.

(9) In the fourth embodiment, the touch electrode connecting portions include the connecting structures (the third connecting portions) for connection with the touch electrodes. However, the third touch lines or the shielding portions may include connecting structures for connection with the touch electrodes. In such a configuration, the touch electrode connecting portions may be omitted. Alternatively, at least two of the third touch lines, the shielding portions, and the touch electrode connecting portions may be connected to the touch electrodes.

(10) The configuration (the third touch lines) of the fourth embodiment and the configuration of the sixth embodiment may be combined. In such a configuration, the third touch lines may extend parallel to the gate lines and thus it is preferable that the third touch lines are prepared from the first metal film from which the gate lines are prepared.

(11) In the fifth embodiment, the line non-overlapping common portions that overlap the partition voids are included in the first touch line of every two touch lines that are adjacent to the source line disposed between the touch electrodes that are adjacent to each other in the X-axis direction. However, the line non-overlapping common portions that overlap the partition voids may be includes in the second touch line of every two touch lines that are adjacent to the source line disposed between the touch electrodes that are adjacent to each other in the X-axis direction.

(12) In each of the fifth and the sixth embodiments, the sections of the touch lines overlap the source lines. However, the touch lines may be disposed such that entire areas of the touch lines do not overlap the source lines.

(13) The areas of the shielding portions in the plan view may be altered from those in each of the above embodiments where appropriate. The areas of the touch electrode connecting portions in the plan view may be altered from those in the fourth embodiments where appropriate.

(14) In each of the fifth and the sixth embodiments, the touch lines are prepared from the third metal film. However, the touch lines may be prepared from the second metal film from which the source lines are prepared. In such a configuration, it is preferable that the first touch lines and the second touch lines included in the touch lines may be separated from the source lines in the X-axis direction to reduce short circuits.

(15) The ratio of the length of the line overlapping common portion of each of the touch lines relative to the length of the line non-overlapping portion or the area of the line overlapping portion relative to the area of the source line non-overlapping portion may be altered from that in each of the above embodiments where appropriate.

(16) The routing of the source lines or the gate lines may be altered from that in each of the above embodiments where appropriate. For example, the source lines may be routed to extend linearly in the Y-axis direction.

(17) In each of the embodiments, the first touch lines and the second touch lines included in the touch lines are prepared from the third metal film. However, the first transparent electrode film may include resistance reduced sections prepared by reducing resistances thereof and defined as the first touch lines and the second touch lines.

(18) In each of the embodiments, two touch lines are disposed between the pixel electrodes that are adjacent to each other in the X-axis direction. However, three or more touch lines may be disposed between the pixel electrodes that are adjacent to each other in the X-axis direction.

(19) In each of the above embodiments, the number of the gate lines is equal to the number of the pixel electrodes in the Y-axis direction and the number of the source lines is equal to the number of the pixel electrodes in the X-axis direction. However, the number of the gate lines may be double the number of the pixel electrodes in the Y-axis direction and the number of the source lines may be a half of the number of the pixel electrodes in the X-axis direction.

(20) In each of the above embodiments, the array substrate includes the bottom gate type TFTs that include the gate electrodes disposed below the channel regions. However, the array substrate may include top gate type TFTs that include gate electrodes disposed above channel regions.
are used for the TFTs and the switch components. However, top gate type TFTs may be used.

(21) In each of the above embodiments, the liquid crystal material included in the liquid crystal layer has the positive dielectric constant anisotropy. However, a liquid crystal material having negative dielectric constant anisotropy may be used.

(22) The screen size or the resolution of the liquid crystal panel may be altered from that in each of the above embodiments where appropriate.

(23) The intervals between the pixels in the liquid crystal panel may be altered from those in each of the above embodiments where appropriate.

(24) In each of the above embodiments, four drivers are mounted on the array substrate. However, the number of the drivers on the array substrate may be altered where appropriate.

(25) In each of the above embodiments, the drivers are directly mounted on the array substrate using the chip on glass (COG) technology. However, a flexible substrate on which drivers are mounted using the chip on film (COF) technology may be connected to the array substrate.

(26) In each of the above embodiments, the gate circuits are provided on the array substrate. However, the gate circuits may be omitted and gate drivers having a function similar to that of the gate circuit may be mounted on the array substrate. The gate circuit may be disposed on only one of sides of the array substrate.

(27) The two-dimensional shape of the pixel overlapping holes in the common electrode may be altered from that in each of the above embodiments where appropriate. For example, the two-dimensional shape of the pixel overlapping holes may be a W shape or a linear shape. The number of the pixel overlapping holes or the intervals between the pixel overlapping holes may be altered where appropriate.

(28) In each of the above embodiments, the pixel overlapping holes are formed in the common electrode. However, common electrode overlapping holes may be formed in the pixel electrodes. The common electrode may be prepared from the first transparent electrode film and the pixel electrodes may be prepared from the second transparent electrode film.

(29) In each of the above embodiments, the TFTs are two-dimensionally arranged in the matrix on the array substrate. However, the TFTs may be two-dimensionally arranged in zigzags.

(30) In each of the above embodiments, the black matrix (the inter-pixel light blocking portion) is provided on the CF substrate. However, the black matrix (the inter-pixel light blocking portion) may be provided on the array substrate.

(31) The semiconductor film from which the channels of the TFTs are prepared may be made of polysilicon other than the material used in each of the above embodiments. In such a configuration, bottom gate type TFTs may be used for the TFTs or top gate type TFTs including light blocking films below channels (on a side on which the backlight unit is disposed).

(32) The display mode of the liquid crystal panel may be different from the display mode in each of the above embodiments. For example, the display mode may be an IPS mode.

(33) In each of the above embodiments, the touch panel pattern uses the projected capacitance method. However, the touch panel pattern may use a mutual capacitance method.

(34) In each of the above embodiments, the transmissive liquid crystal panel is provided as an example. However, the technology described herein may be applied to reflective liquid crystal panels and semitransmissive liquid crystal panels.

(35) In each of the above embodiments, the two-dimensional shape of the liquid crystal display device (the liquid crystal panel or the backlight unit) is the horizontally-long rectangular shape. However, the two-dimensional shape of the liquid crystal display device may be vertically-long rectangular shape, a circular shape, a semicircular shape, an oval shape, an elliptic shape, a trapezoidal shape, or other shapes.

The invention claimed is:

1. A display device comprising:
   pixel electrodes;
   a common electrode overlapping the pixel electrodes via an insulator and including position detecting electrodes separated from each other by partition voids, the position detecting electrodes being arranged in a first direction and a second direction that is perpendicular to the first direction, each of the position detecting electrodes being configured to form a capacitor with a position input member with which a position input operation is performed to detect a position of input by the position input member;
   switching components connected to the pixel electrodes;
   pixel lines extending in the first direction and connected to the switching components and one of the pixel lines disposed between adjacent two pixel electrodes of the pixel electrodes, the adjacent two pixel electrodes being adjacent to each other in the second direction; and
   conductive lines extending in the first direction and electrically connected to the position detecting electrodes, wherein
   the conductive lines include at least two conductive lines disposed between the adjacent two pixel electrodes while having the one of the pixel lines between the at least two conductive lines, the at least two conductive lines extending to straddle two of the position detecting electrodes that are arranged in the first direction,
   the at least two conductive lines are electrically connected to the two of the position detecting electrodes that are arranged in the first direction, respectively, and
   the at least two the conductive lines include common portions having a common positional relation relative to the one of the pixel lines, respectively.

2. The display device according to claim 1, wherein the common portions include line non-overlapping common portions that are disposed not to overlap the one of the pixel lines.

3. The display device according to claim 2, wherein
   the line non-overlapping common portions of the at least two conductive lines sandwich the one of the pixel lines.

4. The display device according to claim 2, wherein
   the line non-overlapping common portions overlap the partition voids.

5. The display device according to claim 2, wherein
   each of the pixel electrodes has an elongated shape, and
   the pixel lines and the conductive lines extend in a lengthwise direction of the pixel electrodes.

6. The display device according to claim 1, further comprising:
   second pixel lines extending in the second direction to cross the one of the pixel lines and to overlap the partition voids and being electrically connected to the switching components, and shielding portions overlapping the second pixel lines via an insulator and being electrically connected to one of the at least two conductive lines.

7. The display device according to claim 1, wherein the position detecting electrodes include conductive line overlapping voids that overlap at least the common portions of the at least two conductive lines, respectively.

8. A display device comprising:
   pixel electrodes;
   a common electrode overlapping the pixel electrodes via an insulator and including position detecting electrodes separated from each other by partition voids, the position detecting electrodes being arranged in a first direction and a second direction that is perpendicular to the first direction, each of the position detecting electrodes being configured to form a capacitor with a position input member with which a position input operation is performed to detect a position of input by the position input member;
   switching components connected to the pixel electrodes;
   pixel lines extending in the first direction and connected to the switching components and one of the pixel lines disposed between adjacent two pixel electrodes of the pixel electrodes, the adjacent two pixel electrodes being adjacent to each other in the second direction;
   conductive lines extending in the first direction and electrically connected to the position detecting electrodes, the conductive lines including at least two conductive lines disposed between the adjacent two pixel electrodes while having the one of the pixel lines between the at least two conductive lines and the at least two conductive lines including common portions having a common positional relation relative to the one of the pixel lines, respectively;
   another pixel lines extending in the second direction to cross the one of the pixel lines and to overlap the partition voids and being electrically connected to the switching components; and shielding portions overlapping the another pixel lines via an insulator and being electrically connected to one of the at least two conductive lines.

* * * * *